(12) United States Patent
Lavu et al.

(10) Patent No.: US 7,698,148 B2
(45) Date of Patent: Apr. 13, 2010

(54) WEB-BASED RISK MANAGEMENT TOOL AND METHOD

(75) Inventors: Ranapratap Lavu, Tucson, AZ (US); John F. Michel, Tucson, AZ (US); Michael P. Peyton, Tucson, AZ (US); Jose Soto, Tucson, AZ (US); Niccolo Garbarino, Tucson, AZ (US); Mathew H. Bosse, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1601 days.

(21) Appl. No.: 10/661,756

(22) Filed: Sep. 12, 2003

(65) Prior Publication Data

US 2005/0060213 A1 Mar. 17, 2005

(51) Int. Cl.
*G06Q 10/00* (2006.01)
*G06Q 30/00* (2006.01)

(52) U.S. Cl. .................. 705/1; 705/7; 705/8; 705/400; 705/500; 702/177; 702/181; 702/187

(58) Field of Classification Search .................... 705/1, 705/7–10; 702/176–179, 181, 187
See application file for complete search history.

(56) References Cited

U.S. PATENT DOCUMENTS

| | | | |
|---|---|---|---|
| 6,088,678 A | 7/2000 | Shannon | |
| 6,397,202 B1 | 5/2002 | Higgins et al. | |
| 6,591,232 B1 | 7/2003 | Kassapoglou | |
| 6,741,951 B2* | 5/2004 | Whaling et al. | 702/179 |
| 6,895,383 B2* | 5/2005 | Heinrich | 705/7 |
| 7,003,439 B2* | 2/2006 | Aldred et al. | 703/10 |
| 7,231,316 B2* | 6/2007 | Whaling et al. | 702/179 |
| 7,319,971 B2* | 1/2008 | Abrahams et al. | 705/7 |
| 7,359,865 B1* | 4/2008 | Connor et al. | 705/10 |
| 7,430,539 B2* | 9/2008 | Glinberg et al. | 705/40 |
| 7,433,829 B2* | 10/2008 | Borgia et al. | 705/7 |
| 7,480,536 B2* | 1/2009 | Kaufman et al. | 700/79 |
| 7,551,086 B2* | 6/2009 | Coop et al. | 702/184 |
| 2001/0027389 A1* | 10/2001 | Beverina et al. | 703/22 |
| 2002/0103630 A1* | 8/2002 | Aldred et al. | 703/10 |
| 2004/0024567 A1* | 2/2004 | Whaling et al. | 702/179 |
| 2004/0059741 A1* | 3/2004 | Whaling et al. | 707/100 |
| 2005/0086090 A1* | 4/2005 | Abrahams et al. | 705/7 |
| 2005/0149289 A1* | 7/2005 | Whaling et al. | 702/181 |
| 2005/0278248 A1* | 12/2005 | Sakimura et al. | 705/38 |
| 2008/0126150 A1* | 5/2008 | Kaufman et al. | 705/7 |
| 2009/0012631 A1* | 1/2009 | Fuller | 700/1 |
| 2009/0070170 A1* | 3/2009 | Krishnamurthy | 705/7 |

* cited by examiner

*Primary Examiner*—John G Weiss
*Assistant Examiner*—Michael M Thompson
(74) *Attorney, Agent, or Firm*—Eric A. Gifford

(57) ABSTRACT

The present invention provides a risk management tool and method for creating an improved initial risk management process that captures, assesses, and prioritizes risks and implements mitigation plans to more effectively manage risk in large-scale development projects. A web-based system allows users and management to share and access risk information to more readily identify and assess risks, develop mitigation plans and track the risk management process. The tool and specifically the Pf and Cf tables are tailored to each project to more accurately calculate and prioritize risk factors RF and thus anticipate and minimize or eliminate risks before they occur. The demonstrated value of the tool is found in timely deliveries and a reduction of cost overruns as well as an increase in customer enhanced award fees.

34 Claims, 19 Drawing Sheets

Figure 8a

Enterprise Search Results

Search Parameters: Current
Risk Title contains - 'Battery'
7 Risks Found

| Risk No | Program | Risk Title | Risk Factor | |
|---|---|---|---|---|
| 94 | MK45 TDD | Missile Battery Capacity | 0 | Transfer |
| 12 | Tactical Tomahawk LRIP | CMA Battery Delivery Schedule | | Transfer |
| 5 | Example Program | Battery Power Duration | .32 | Transfer |
| 1002 | EKV | KV Battery (TBP) | .01 | Transfer |
| 1022 | EKV | CLOSED: Battery End-of-Life performance (TBP) | 0 | Transfer |
| 105 | Excalibur | Thermal Battery Terminal Header Gun Hardening | .28 | Transfer |

Figure 8b

| Rating | Performance (Tech) Impact 90 | | Cost Impact 86 | | Schedule Impact 88 | |
|---|---|---|---|---|---|---|
| | Alternatives | Performance | Program Threat | Amount | Program Slip | AMOUNT* |
| 1.0 | No alternatives exist; Tech breakthrough reqd. | Key Rqmts not met; Inadequate | Program threat is certain | NRE>$1 M Unit>$500 | Major prog. milestones moved; Prog threatened | >4.5 months |
| 0.9 | Significant Redesign reqd. | Unacceptable unmet rqmts | Major impact to cust/contract costs | NRE>$900K Unit>$450 | Major impact to customer or contract plans | >4 months |
| 0.8 | Redesign or alternate reqd to achieve. | Degradation affecting usability | Affects other activities; Cost goal in jeopardy. | >$800K Unit>$400 | Critical path events are threatened; entire schedule jeopardized. | >3.5 months |
| 0.7 | No adequate backup. | Significant chg from plan | Changes require revision w/cust. | NRE>$700K Unit>$350 | Intermediate milestones require revision w/ cust. | >3 months |
| 0.6 | Inferior backup. | Degraded | Significant rebudgeting reqd. | NRE>$600K Unit>$300 | Significant program rescheduling required | >2.5 months |
| 0.5 | Possible alternative exists. | Moderately Reduced | Some rebudgeting required. | NRE>$500K Unit>$250 | Some program changes; critical path affected. | >2 months |
| 0.4 | An adequate alternative exists. | Slight rqmt reduction | Changes within mgmt reserve. | NRE>$400K Unit>$200 | Internal milestones chgd. Schd slip w/ alternatives | >1.5 months |
| 0.3 | A few adequate alternatives exist | Minor rqmt deficiency | Minor within budgeted range. | NRE>$300K Unit>$150 | Subsystem slip within IPT Requires workaround. | >1 month |

Figure 10

Raytheon

| Program List | Risk List | Reports | Submit New Risk | Find Risks | Login/Logout | Help |
|---|---|---|---|---|---|---|

Raytheon home | Directories | Search | Using the Web

S arch Parameters: Current
Omitting Closed Risks
Ri ks F und: 8

Find / Sort more...

Admin more...

Example Program Risks

| Risk # | Title | Actionee | Risk Factor | | | | |
|---|---|---|---|---|---|---|---|
| C | 2 | Untested Avionics Section | Michael Peyton | .56 | Edit Mit View Hide |
| C | 1 | Warhead Lethality | Paul Grana | .42 | Edit Mit View Hide |
| C | 3 | Missile Maneuverability | John Strapac | .36 | Edit Mit View Hide |
| C | 11 | Slow IMU Startup after storage | Michael Peyton | .36 | Edit Mit View Hide |
| C | 5 | Battery Power Duration | Jerry Ellzey | .32 | Edit Mit View Hide |
| C | 4 | Cold Soaked Missile Performance | Rachel Darnell | .30 | Edit Mit View Hide |
| C | 8 | HAI delivery of Launch Tube Assemblies | Niccolo Garbarino | .14 | Edit Mit View Hide |
| C | 9 | 3 to 6 words capturing the essence of the risk | Jose Soto | .09 | Edit Mit View Hide |

Current Mitigation Plan

65

| Num. | Activity | Pf | Cf | Plan Comp | Comp | Misc. | |
|---|---|---|---|---|---|---|---|
| 1 | Selected avionics will be bench tested | .5 | .8 | 02/16/2002 | 06/28/2002 | IMP/S: 2-345 | all info delete |

Results: All selected avionics modules passed the bench tests. We expected 95%.

Update Activities

| | | | | | | | |
|---|---|---|---|---|---|---|---|
| 2 | Environmental tests conducted for those | .4 | .8 | 11/08/2002 | 11/22/2002 | IMP/S: 3-231 | all info delete |

Results:

Update Activities

| | | | | | | | |
|---|---|---|---|---|---|---|---|
| 3 | Those items that do not pass bench or | .2 | .8 | 08/09/2003 | | Actionee: Rachel Darnell IMP/S: 4-111 | all info delete |

WEB-BASED RISK MANAGEMENT TOOL AND METHOD

BACKGROUND OF THE INVENTION

1. Field of the Invention

This invention relates to risk management in large-scale development projects, and more specifically to a web-based risk management tool and method for capturing, assessing, and prioritizing risks and implementing mitigation plans to more effectively manage risk.

2. Description of the Related Art

Due to the level of complexity of multi-million and even billion dollar programs such as the design, development and production of next generation weapon systems, aircraft or spacecraft, delivery of the product on time, within budget and with a high degree of quality assurance is a formidable task.

A typical risk management process 10 incorporates a number of different tools to identify, assess, mitigate and track risk as illustrated in FIG. 1. In the initial phase, project management defines a Risk Management Plan detailing their approach for conducting risk management for the specific project based on customer requirements 12 such as technical specifications, cost and schedule (step 14). The plan outlines how risks will be identified and assessed, how mitigation plans will be developed, how risks will be tracked and what tools and methods will be used. A program risk manager is tasked with implementing the plan and overseeing the risk management portion of the project.

The first step is for each engineer to identify risks that may be associated with each of their tasks (step 16). To assist in this process, each engineer has a risk management tool such as Risk Radar on his or her own PC. The engineer may rely on his or her knowledge and experience, discussions with other engineers and a tool called Technical Risk Identification and Mitigation System (TRIMS), which is mainly used to identify process risks when a program is transitioning between phases such as development to production. The identified risks are then input into the risk management tool's local database on the PC. The engineer may be required to submit the identified risks to the program risk manager for consideration by the risk review board.

To assess the risks (step 18), the engineer refers to a probability of occurrence table 20 of the type shown in FIG. 2 and based on his or her own knowledge and experience rates the probability of failure for a task occurring to be, for example, remote, unlikely, likely, highly likely or near certainty. These labels are then mapped to probabilities Pf and stored in the risk management tool. The selection of Pf is highly subjective based on the engineer's experience, interpretation of the task and interpretation of the labels. Next, the engineer refers to a severity of occurrence table 22 of the type shown in FIG. 3 and selects the impacts 0, 1, 2, 3, 4, or 5 of failure on the basis of technical, schedule and cost impacts, which are also stored in the tool. The cost impact is specified as a percentage of the cost. Schedule impact is oftentimes specified as a percent slippage of a key milestone or, as shown in this case, in general terms of effect on key milestones. The tool calculates a risk factor Rf as the product of the probability of occurrence Pf and the largest impact. The risk factors are then prioritized as, for example, low, moderate and high based on thresholding rules set by the risk management plan and stored in the local database. The priority of the risk factors determines which risk receives special attention and resources and which will not and thus the accuracy and consistency with which they are determined is critical. In the current approach, the risk factors are highly subjective and dependent on the knowledge and expertise of the individual engineer. To accommodate any risk on any project, the Pf and Cf tables are very general. At this point, the engineer may be required to submit a report on the assessed risks to the program risk manager for consideration by the risk review board or may proceed directly to the development of risk mitigation plans. The risk manager maintains a master database of the aggregated reports from each engineer or team, monitors progress and reports back through risk review meetings on the status of risk mitigation.

To develop a risk mitigation plan (step 24), the engineer first refers to the risk assessment to determine the priority of the risk. A risk with a high risk assessment is expected to receive more resources for mitigation. In most cases, the engineer proposes a mitigation plan based on his or her knowledge and experience and submits the plan to the program risk manager for consideration by the risk review board. The board must consider all the program risk factors based on the risk factors and mitigation plans created independently by each engineer and, as constrained by available resources, make critical decisions on the mitigation plans to be funded and implemented. The board's decisions are only as good as the risk factors and plans provided.

At this point, the identified risks, risk factors and accepted mitigation plans form an initial input to the integrated master plan that is the initial input to a program master schedule. A tool such as Microsoft Project is used to create a detailed schedule that links all the tasks and sub-tasks and mitigation plans together. As the project progresses, the engineers and managers continually update MS Project to track achieved milestones, slippage and reasons for revision. The progress information and trends from MS Project are forwarded to the risk manager to track and report risks (step 26) and analyze the information to determine whether new risks should be identified.

Based on the current status, the engineer updates the risk and mitigation plan status and submits the updates to the project risk manager (step 28). If risks are successfully mitigated and the milestones achieved, the risks are closed (step 30). If a risk changes, the engineer reassesses the probability of occurrence and impact (step 18), makes required adjustments to the mitigation plan and drafts a program plan adjustment report that is submitted to the project manager (step 32). In some cases, a Monte Carlo simulation such as Risk Plus is run on the schedule based on the most optimistic and pessimistic milestone dates and generates additional scheduling risks that should be considered. If a new risk or task appears, the engineer identifies the risk (step 16) and repeats the process. If the scope of the project changes, the process returns to the initial phase for reconsideration of the risk management plan (step 14).

The standard risk management process both in determining an initial or baseline risk mitigation plan and in monitoring ongoing risks is highly subjective and based on the knowledge, experience and decision making capability of many engineers acting independently and in relative isolation to identify risks, determine the risk factors Rf and the development of mitigation plans. The Pf and Cf tables on which the engineers base their assessments are generalized to accommodate any program and any risk. Furthermore, the process is highly bureaucratic in that engineers must prepare and submit multiple reports with very similar information for consideration by the review board.

U.S. Pat. No. 6,397,202 to Robert Higgens entitled "System and Method for Monitoring Risk in a System Development Program" has proposed a technique for an automated expert system to quantify various types of ongoing risk. The system defines a plurality of metrics such as requirements, staffing and source lines of code (SLOC) that relate to the successful completion of the project and projects a baseline for each metric. The system collects data for each metric over a period of time, compares the measured data to the baseline and assigns a risk based on the percentage the measured value deviates from the baseline. The metrics may be weighted to define the relative importance of the data measurements. When the project risk becomes sufficiently high, the program manager is alerted to the problem and can take measures to diminish the risk.

Higgens relies on logical statements, algorithms, and the like, provided by experts who are knowledgeable in analyzing this type of data to determine an output risk level. The expert's rationale is, in effect, captured and stored with the rule-based system. Although a fully-automated expert system has obvious appeal, practice has shown that one size fits all systems that remove all human judgment are rarely effective, the risks encountered do not fit into predefined categories and are more complex than can be adequately handled by if-then type rules. Furthermore, Higgens assumes some baseline and then provides a system for monitoring the ongoing risks relative to that baseline and reacting to them.

There remains an acute and present need to provide a risk management tool and method that is applicable to a wide range of projects but tailorable to a specific project, provides a better technique for assessing and mitigating risks to anticipate and minimize risks, and streamlines the risk management process.

SUMMARY OF THE INVENTION

The present invention provides a risk management tool and method for creating an improved initial risk management process that captures, assesses, and prioritizes risks and implements mitigation plans to more effectively identify, assess and manage risk in large-scale development projects. The invention utilizes a web-based system in which users and management can share and access risk information and can tailor the tool to a particular project to better anticipate and thus minimize the effects of risks.

This is accomplished with a web-based tool that accesses a shared database and serves a plurality of users via a company intranet. The database stores accumulated information from past and current projects relating to risk. More specifically, information relating to specific risks that have been encountered by other users or on other programs is aggregated and periodically updated. A tailorable probability of occurrence table maps categories of risk such as assembly, engineering, lifetime, hardware, management, etc. to a probability of failure (Pf) based on standardized qualitative probability definitions. A tailorable severity of consequence table maps cost impact, schedule impact and technical/performance to a severity measure (Cf) based on standardized qualitative descriptions that are assigned program specific values. In particular, cost impact is sub-divided into development cost (NRE), unit cost (DTC) and operations and support cost (O/S) and specified in dollar amounts for the current project, and schedule impact is specified in actual days, weeks or months for the current project. Information is stored to augment a user's personal knowledge to select the most appropriate Pf and Cf entries. Mitigation plans for addressing prioritized risk factors are aggregated and periodically updated from a multitude of users and programs.

The risk management process starts with the definition of the risk management plan based on customer requirements such as technical specifications, cost targets and schedule. The plan outlines how risks will be identified and assessed, how mitigation plans will be developed, how risks will be tracked and what tools will be used. In addition, the Pf and Cf tables are tailored to the current project. The Pf table is pruned to include only those categories that are relevant to the current project. The cost impact values in dollars for NRE, DTC and O/S and the schedule impact values in days, weeks or months are entered in the Cf table. This closely tailors risk assessment to a particular project and reduces subjectivity of users of the web-based tool.

To create an initial set of risks, each user must first identify possible risks associated with his or her assigned task. To augment their own knowledge and experience, users will generate an enterprise search of the shared database. Once identified, the user must assess each risk and assign a risk factor (Rf). For each risk, the user views the Pf table configured for the current project, selects the category most appropriate for the particular risk and selects the qualitative probability definition that most closely characterizes the risk thereby specifying a value of Pf Then the user views the Cf table configured for the current project and, on the assumption that the risk occurs, selects the cost, schedule and performance impacts based on the anticipated consequences. The tool calculates the risk factor Rf as the product of Pf and the highest Cf of the three and classifies the risk as, for example, low, moderate or high.

The risks, risk factors and the underlying data are aggregated in the database, ranked and provided to a risk review group, which assess the risks at periodic meetings and oversees the creation and implementation of mitigation plans. For example, low risks may be mitigated by the user but receive no other attention from the board, moderate risks may warrant a mitigation plan developed and implemented by the user who identified the risk with board oversight, and high risks may cause the immediate formation of a special review team to develop and manage the mitigation plan. The user or board can augment their own knowledge and expertise by conducting a mitigation search of the database to identify mitigation plans that have been tried successfully or unsuccessfully on the same or similar risks in the past.

As a result, risks are captured, assessed, prioritized and mitigation plans are integrated into the Integrated Master Plan before the project starts and the risks actually occur. As the plan is implemented it is inevitable that notwithstanding the mitigation plans some risks will occur and new risks will arise. The web-based tool facilitates tracking the status of these risks and generating reports to the management groups so that the same management processes can be applied in a timely manner to these risks to keep the project on schedule and within budget and to deliver incorporating customer specifications.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 8a and 8b are web shots of an enterprise search form for identifying risks from the shared database and exemplary search results;

FIG. 10 is a web shot of a Cf table for a particular project;

FIG. 11 is a web shot of the prioritized and aggregated risk factors as presented to the risk review board;

FIGS. 12a and 12b are web shots of a mitigation search for identifying mitigation plans from the shared database and exemplary search results;

FIGS. 13a through 13c are, respectively, a screenshot of the Minutes input page of the tool, an example of the Minutes output report, and an example of the most common risk report (Risk Review Board Report)

DETAILED DESCRIPTION OF THE INVENTION

The present invention provides a risk management tool and method for creating an improved initial risk management process that captures, assesses, and prioritizes risks and implements mitigation plans to more effectively manage risk in large-scale development projects. The invention utilizes a web-based system in which users and management can share and access risk information to more readily identify and assess risks, develop mitigation plans and track the risk management process. The tool and specifically the Pf and Cf tables can be tailored to a particular project to more accurately calculate and prioritize risk factors RF and thus anticipate and minimize or eliminate risks before they occur. The demonstrated value of the tool is found in timely deliveries and a reduction of cost overruns as well as an increase in customer enhanced award fees.

Figure 4A:
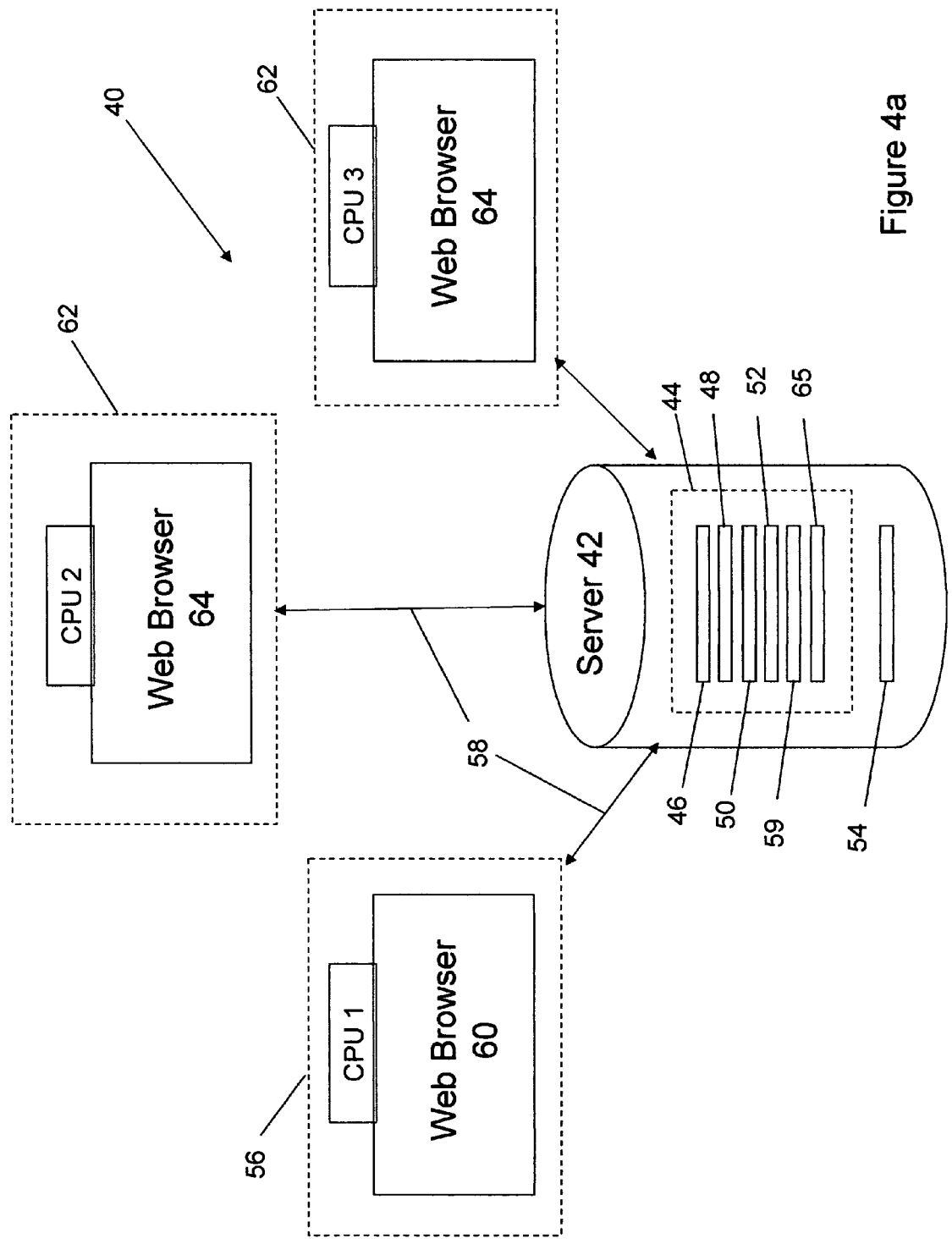
FIGS. 4a and 4b are block diagrams of a centralized server and a plurality of interconnected workstations and the web-based risk management tool in accordance with the present invention.

As shown in FIG. 4a, a web-based risk management system 40 for managing risk related to a successful completion of a development project comprises a server 42 having a shared risk database 44 that stores a probability of occurrence (Pf) table 46 and a severity of consequence (Cf) table 48, risk identification information 50 and risk mitigation information 52. A risk management tool 54 located on the server provides standardized interfaces for searching, viewing and entering information to and from the shared risk data base via a web browser. A computer workstation 56 in communication with the server 42 via an intranet 58 is used to enter a Risk Management Plan 59 for the current development project and tailor the Pf and Cf tables via a web browser 60. A plurality of computer workstations 62 in communication with the server via the intranet are provided for the engineers charged with developing and implementing the risk management plan. Each workstation is provided with a web browser 64 to search the database 44 to identify risks, to select entries from the tailored Pf and Cf tables to calculate and prioritize a risk factor Rf for each risk, to search the database for available risk mitigation information to develop risk mitigation plans 65 and to track and report on the status of identified risks. The actual identified risks, mitigation plans and their effectiveness are saved back in the database for access by other workstations on the network.

Figure 4B:
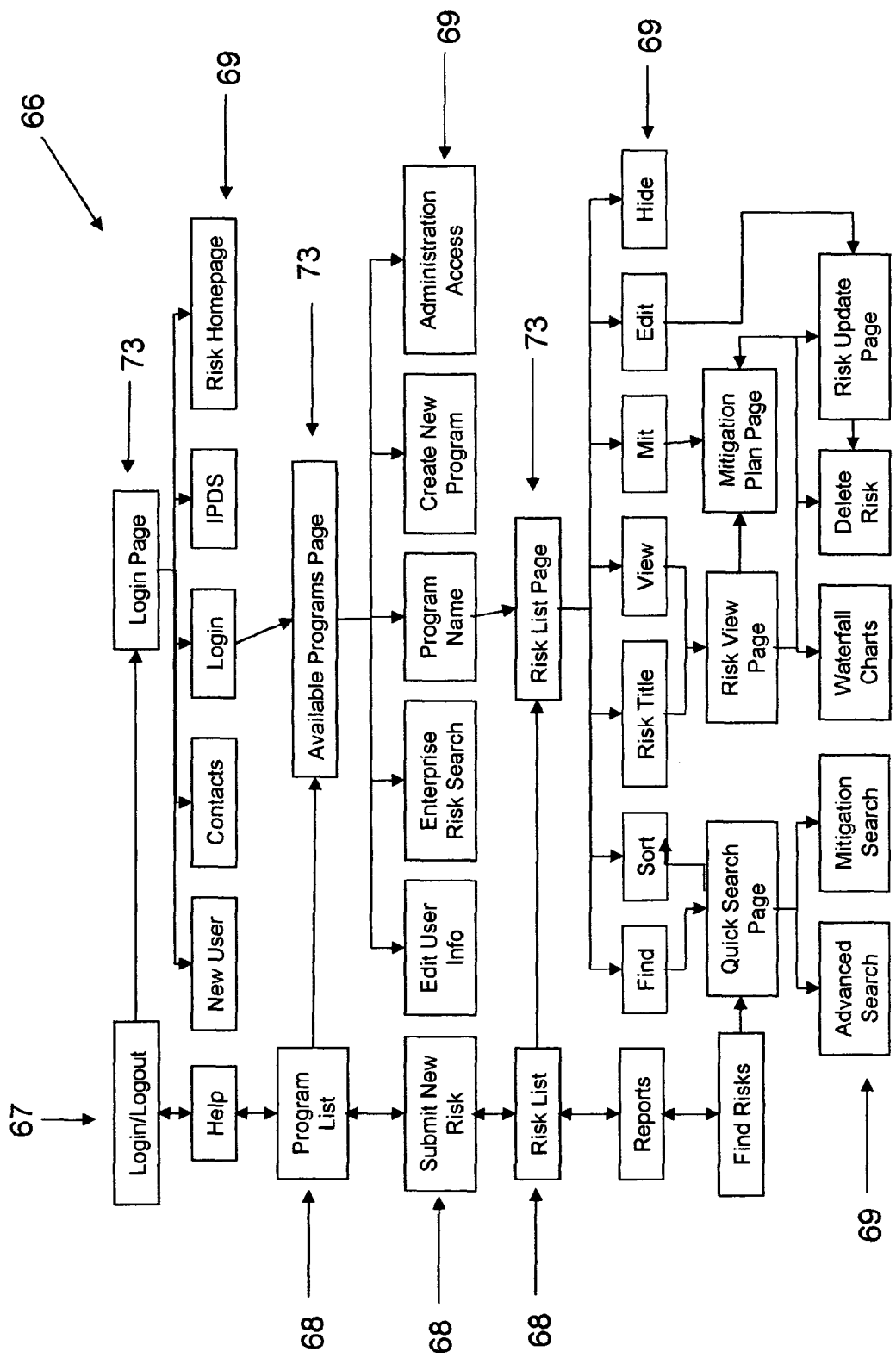

As shown in FIG. 4b, the risk management tool 54 is a web-based tool having a browser interface 66 that allows users to search, view and edit risk information stored on the database. The interface 66 includes a menu bar 67 having menu items 68 including Login/Logout, Help, Program List, Submit New Risk, Risk List, Reports and Find Risks. Clicking through these pull down menu items 68 provides access to hyperlinks 69 that allow the user to interact with information on the database, construct searches, define risks, develop mitigation plans and generate reports and view that information on layout pages 73 such as the Login Page, Available Programs Page, Risk List Page, etc. The Pf and Cf tables are found from a hyperlink above the pull down menus.

To support the risk management process shown in FIG. 5, the web-based tool 54 is organized and used in part as follows. A user navigates to the Login Page, selects the "Login" menu item, enters a name and password and, if validated, enters the Available Programs Page. The Login Page also includes hyperlinks 69 for New User, Forgot Password, Contacts, IPDS and Risk Homepage items. By selecting "New User", any user can gain limited access to the tool through a security system that ensures US citizenship. There are three levels of access: read-only, write, and administrative. A new user will be given read only access to all programs. Write/Administrative access can only be given by the program creator or by the Database Administrator or Risk Manager. By selecting "IPDS", a user can access risk flow charts that describe each of the main steps in the risk management process shown in FIG. 5.

The Available Programs Page is a list of all the programs using the risk tool that have released their information. By clicking on Administration Access, the user can create a new program or, assuming necessary permissions, can access the Pf and Cf tables and tailor them for the current project as detailed in FIGS. 6 and 7. By clicking on "Enterprise Risk Search" from the Available Programs Page menu, the user can search the shared database to identify risks as detailed in FIGS. 8a and 8b. By clicking on a particular "Program Name" in the list, the user can retrieve and view all of the risks in the current program as detailed in FIG. 11. Clicking on any risk title within the list allows the user to view a Risk Review Board report (FIG. 13c) that displays all of the information about that risk including its mitigation plan and risk assessment. Clicking on the Edit User Info on the Available Programs Page allows the user to change his/her username and password. Clicking on Create New Program allows the user to add a program to the database.

Figure 12A:
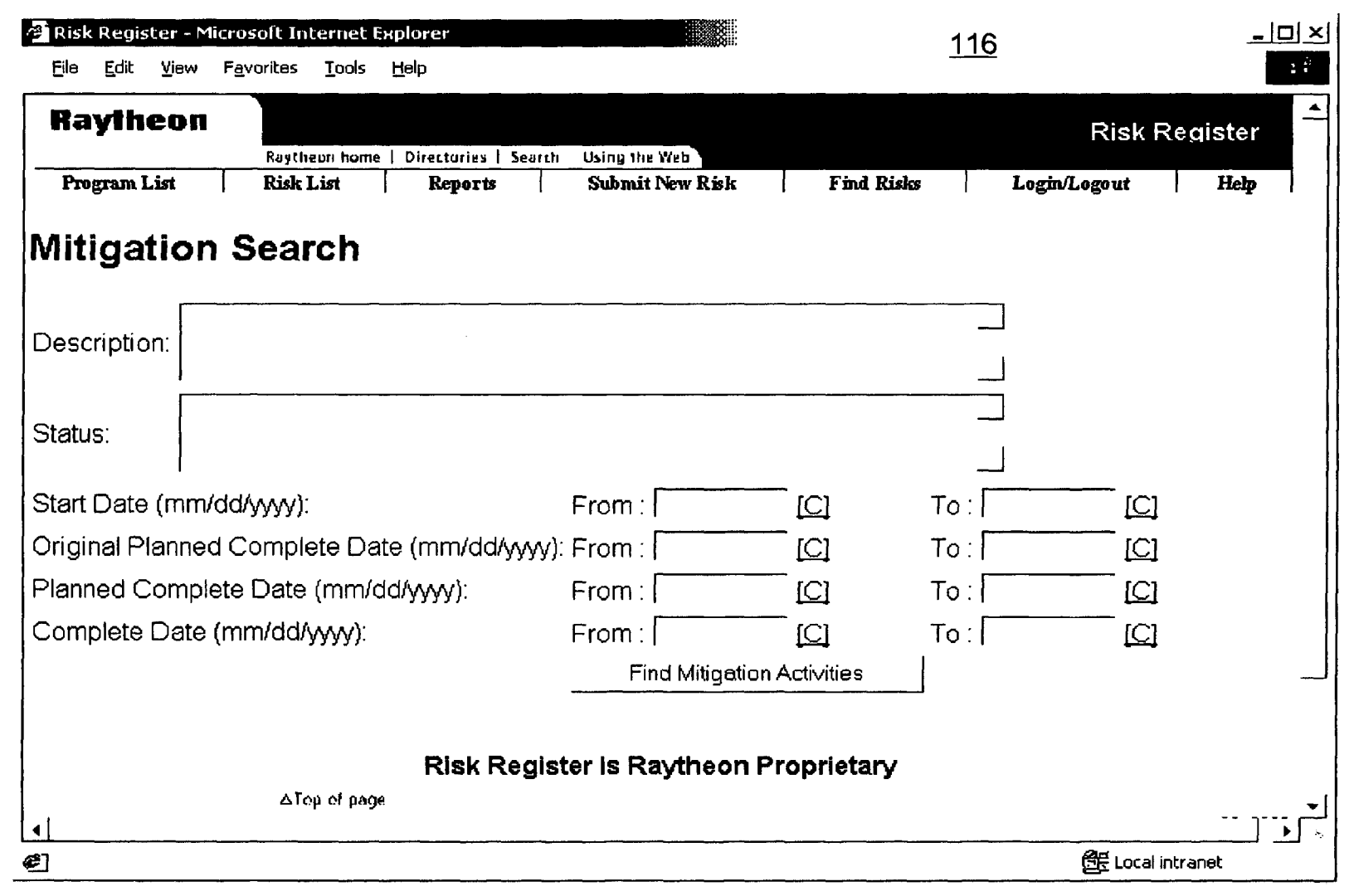

The Risk List Page allows the user to Find specific risks from within the program list of risks and Sort the risks based upon alphabetical listings, dates or numbers relating to all of the fields within the tool. The Find and Sort hyperlinks take the user to the Quick Search Page which allows an Advanced Search if the user requires a specific search from a more detailed list of fields. The Quick Search Page also offers a Mitigation Search capability allowing the user to find specific mitigation plans (FIG. 12b). From the Risk List Page, a user with "write" or "administrative" privileges can select "Mit", "Edit", "View" and "Hide." The user selects "Mit" to view and edit the current mitigation plan for a particular risk as shown in FIG. 12b. By further selecting "Mitigation Search" the user is able to search the database for existing plans or information related to the current risk as shown in FIG. 12a. By selecting "Edit" the user is able to edit all of the risk's fields except for the mitigation plan. The "View" hyperlink allows the user to see, but not edit the entire Risk Review Board Report (FIG. 13c) on the Risk View Page. Also, on the Risk View Page, the user can select a Waterfall Chart for the risk being reviewed. The Waterfall Chart is developed in MS Excel based on dates and Pf plus Cf numbers in the mitigation plan. The Chart graphically displays how the risk is mitigated over time. Clicking on "Hide" allows the user to temporarily eliminate a particular risk from the list of risks so that a report can be developed omitting that particular risk.

Figure 13A:
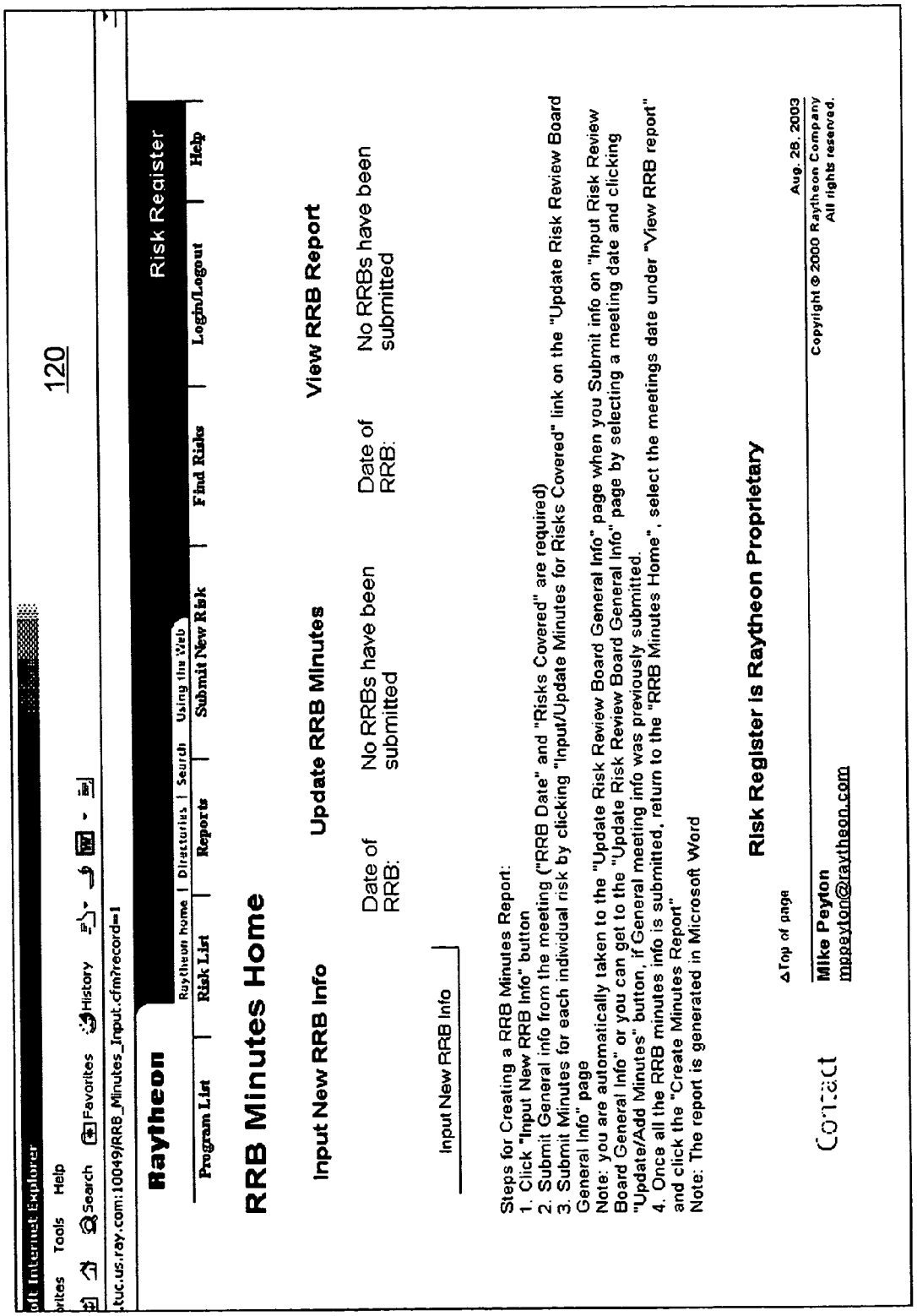
Figure 13B:
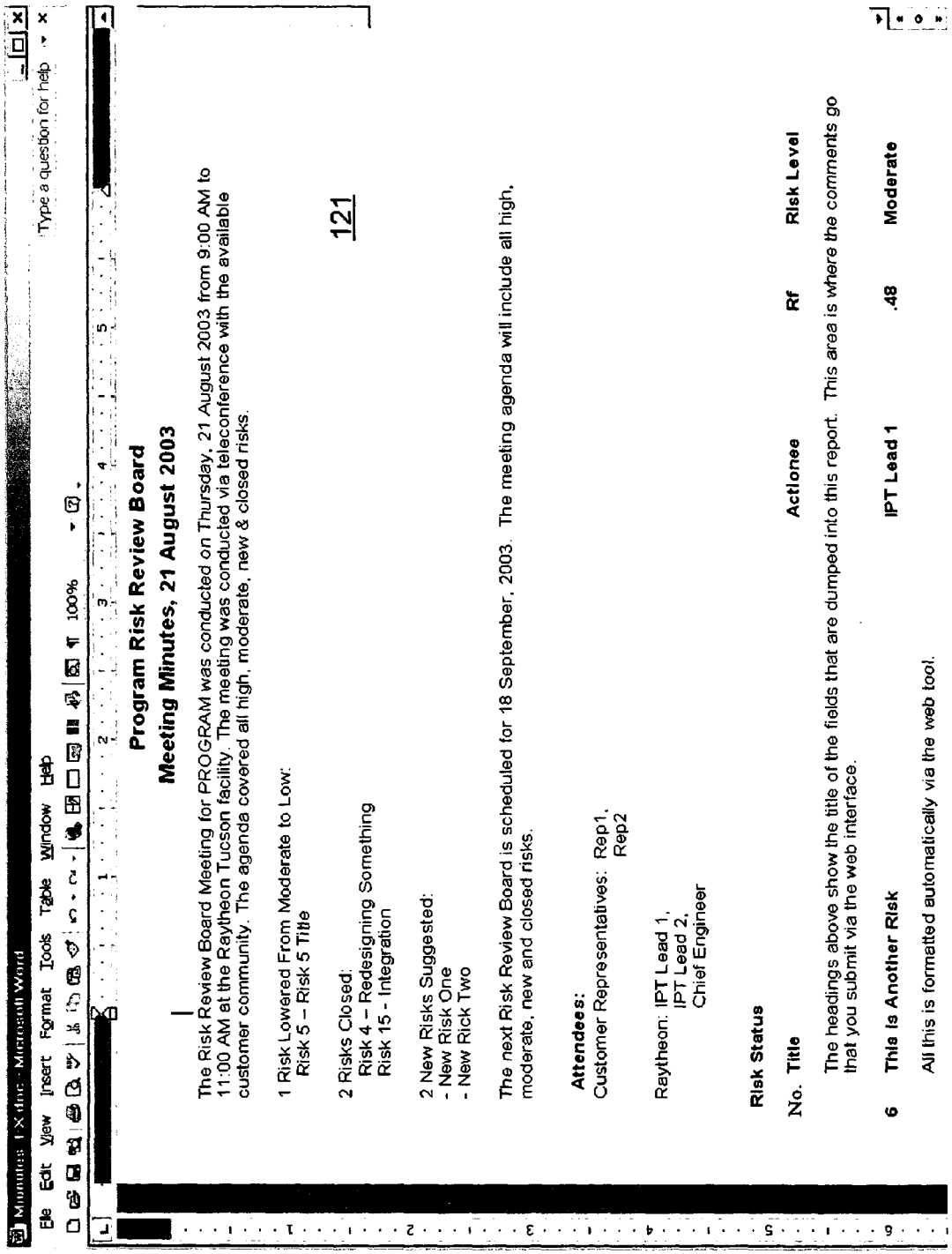
Figure 13C:
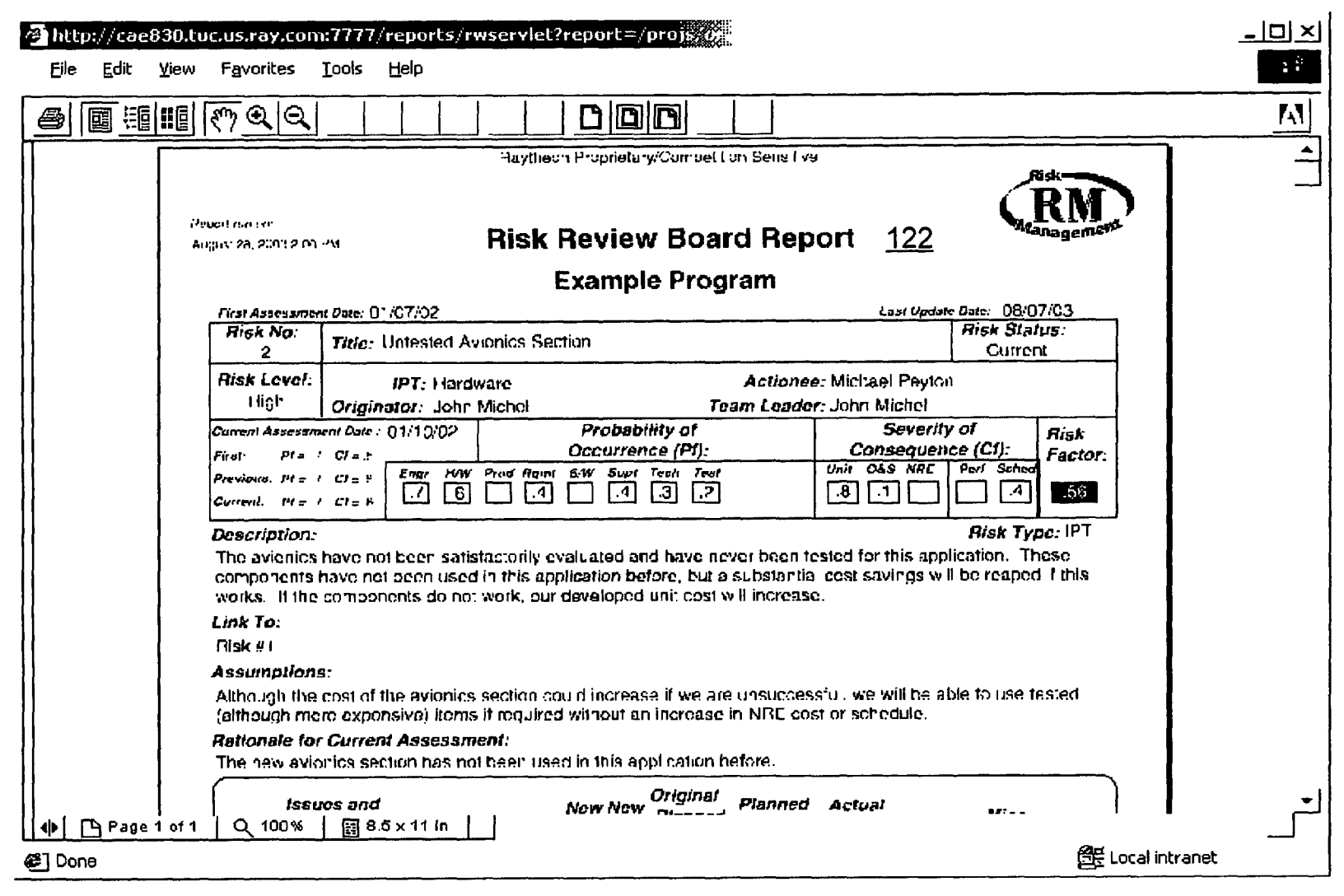

By selecting "Reports", on the menu bar the user can access a wide variety of reports including Risk Quick List, Risk List, Risk Review Board Report, Top 10 Scatter Chart, Top 25 Scatter Chart, Status Report, Assessment Summary, Assessment Rational, Mitigation Activity Report, Personnel List, Quad Chart and Minutes which are available in Adobe Acrobat PDF, MS Word or MS Excel formats. An example of the interface to record minutes of the risk review board and generate the report is illustrated in FIGS. 13a through 13c.

Figure 5:
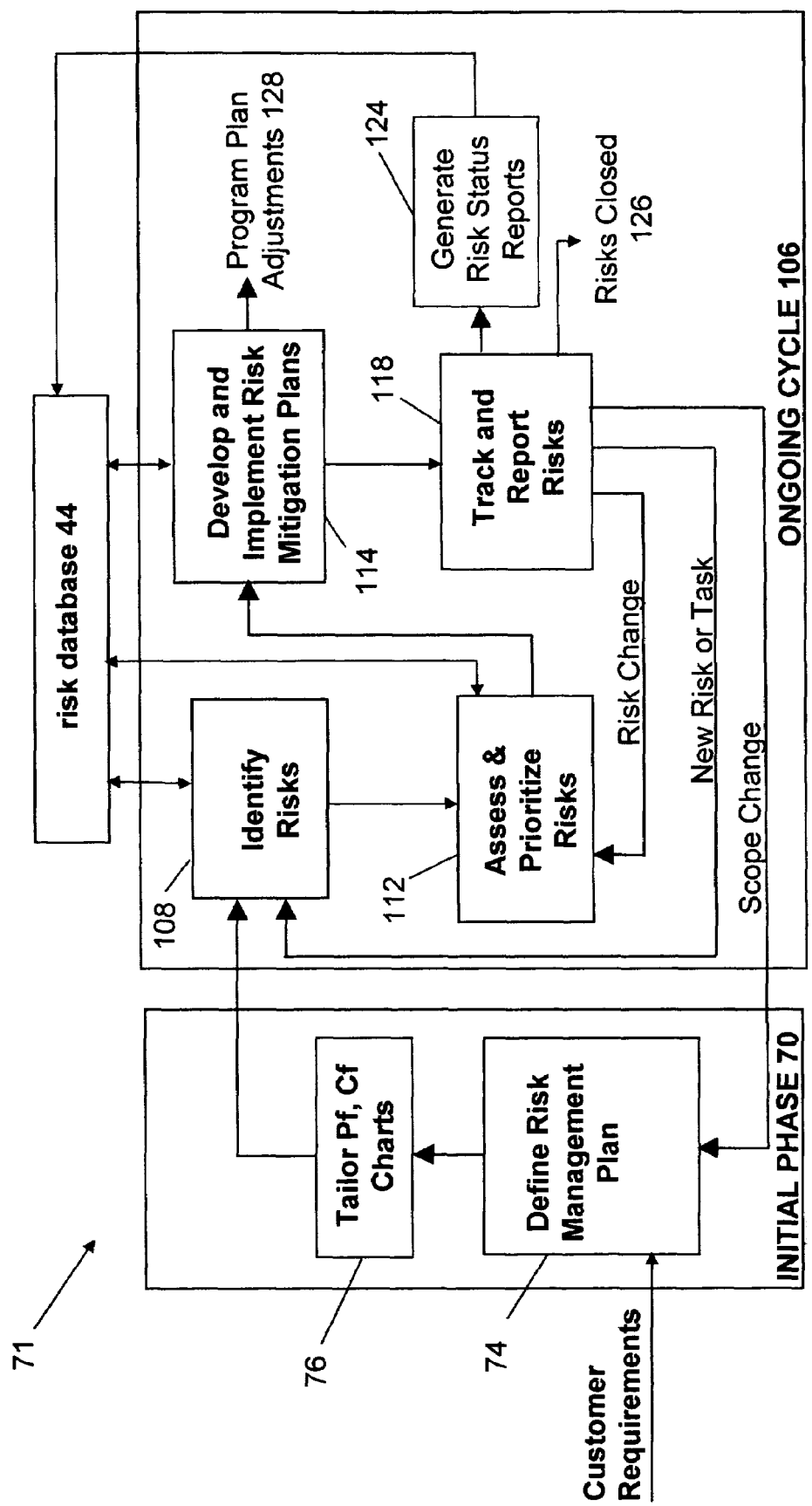
FIG. 5 is a block diagram of a risk management process that embodies the present invention.

As illustrated in FIG. 5, in an initial phase 70 of a risk management process 71 the program risk manager and a risk review board define a risk management plan 59 (step 74). The plan is based on customer requirements such as technical specifications, cost targets and schedule for the current project and outlines how risks will be identified and assessed, how mitigation plans will be developed, how risks will be tracked and what tools will be used.

The risk manager and review board use the tool ("Administration Access") to tailor the Pf table 46 and Cf table 48 to the current project (step 76) to facilitate computation of the risk factor Rf. Experience gained over a number of years and many development projects has shown that accurately estimating and prioritizing the risk factor early enough in the process is key to anticipating and providing mitigation resources to the risks rated high enough to cause program disruption. Thus, it is very important to create the Pf and Cf tables in such a manner that they are both robust enough to be applicable to various programs and a wide range of risks but specific enough to provide reliable risk factors.

Figure 6:
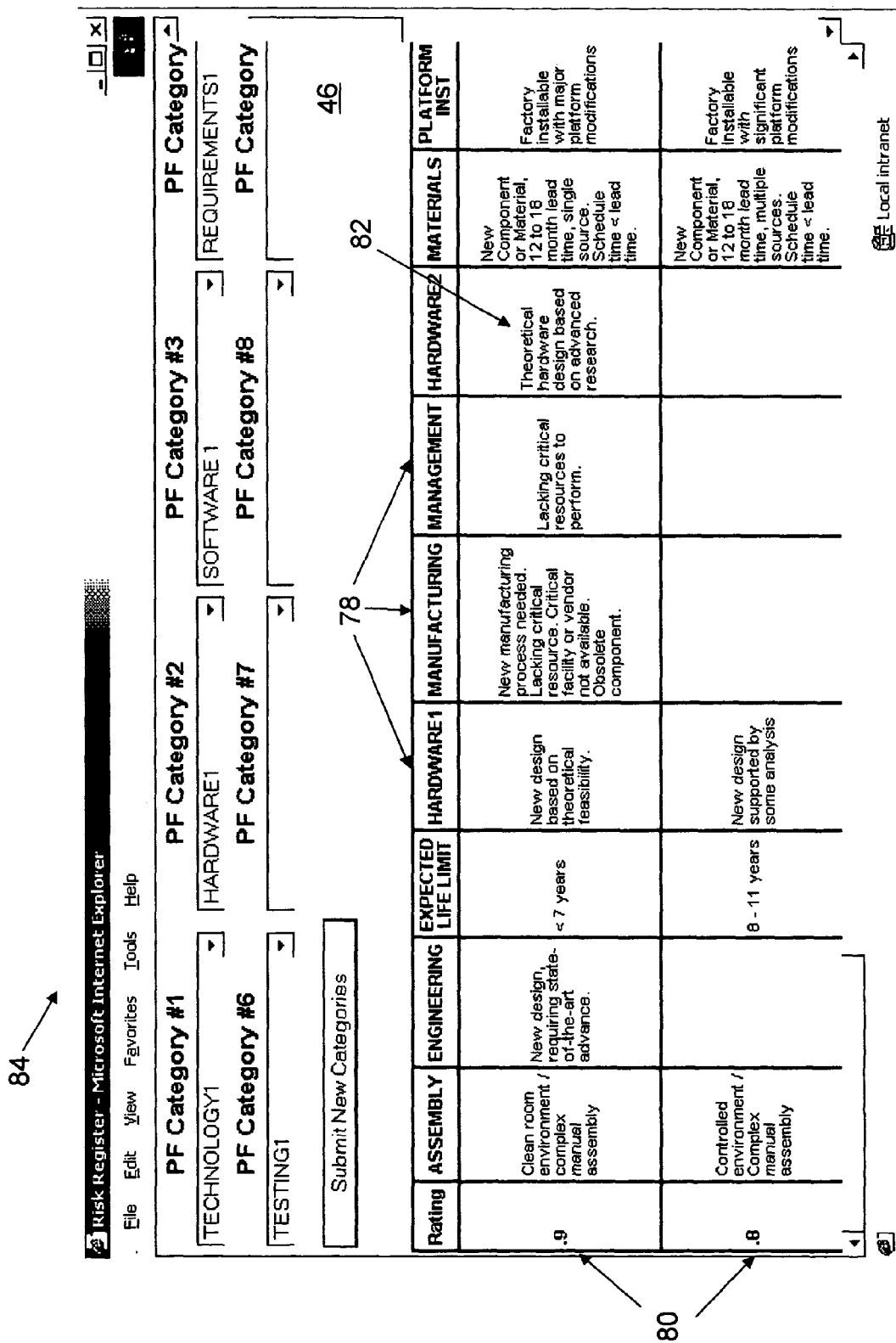
FIG. 6 is a web shot of a tailorable probability of occurrence (Pf) table for use in the web-based risk management tool.

As shown in FIG. 6, the probability of occurrence table 46 maps categories of risk 78 to a probability of failure (Pf) 80 based on standardized qualitative probability descriptions 82. Currently thirty-two different categories have been defined for characterizing different risks at different stages in a development project. These include ASSEMBLY, ENGINEERING, EXPECTED LIFE LIMIT, HARDWARE, MANUFACTURING, MANAGEMENT, HARDWARE2, MATERIALS, PLATFORM INST, PRODUCIBILITY1, PRODUCIBILITY2, PROGRAM, REQUIREMENTS1, SOFTWARE1, REQUIREMENTS2, SOFTWARE2, SUPPORTABILITY, SUPPORT, STRUCTURE, TECH MANUALS, TECHNOLOGY1, TECHNOLOGY2, TEST & INSPECT, TESTING1, TESTING2, TRAINING, FREQUENCY, OVERALL, RELIABILITY, OBSOLESCENCE, DESIGN HW SW and PROCESS REQUIREMENTS. It is important to note that the categories 78 are not the identified risks. As a result, it is not necessary for each new project to uniquely define specific risk categories and define the probability definition for each probability. This would be unwieldy. The probability descriptions 82 are standardized, qualitative and detailed to reduce subjectivity of individual engineers and select a more accurate risk factor for the current project. The web interface 84 supported by the tool, prompts the manager to select from the thirty-two risk categories they want to use in the current project. In addition, the interface allows them to define a new category and standardized qualitative probability definitions should they so choose.

Figure 7:
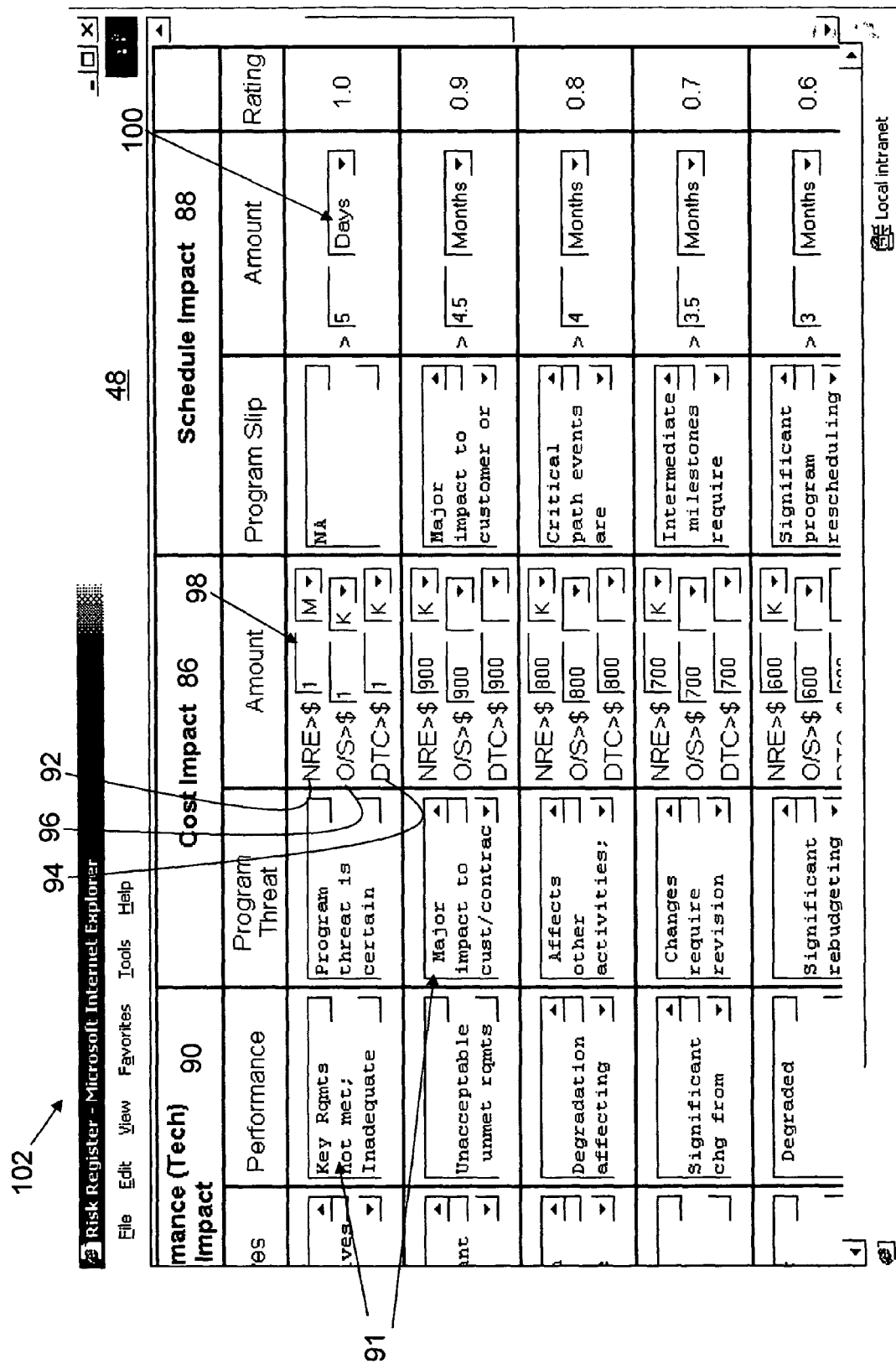
FIG. 7 is a web shot of a tailorable severity of occurrence table (Cf) for use in the web-based risk management tool.

As shown in FIG. 7, the severity of consequence table 48 maps cost impact 86, schedule impact 88 and technical/performance 90 to a severity measure (Cf) based on qualitative descriptions 91 that are assigned program specific values. In particular, cost impact 86 is sub-divided into development cost (NRE) 92, unit cost or design-to-cost (DTC) 94 and operations and support cost (O/S) 96 and specified in dollar amounts 98 for the current project, and schedule impact 88 is specified in actual days, weeks or months 100 for the current project. The web interface 102 supported by the tool, prompts the manager or review board to select the qualitative descriptions 91 for each entry of each impact from a menu of choices or enter a new description. The interface also prompts the manager to enter specific dollar amounts for the different cost impacts and the number of days, weeks or months for the schedule impact. The dollar amounts that correspond to the same severity may be dramatically different for the three cost impacts. Furthermore, the schedule impact of a delay is tailored to a given project rather than being a percentage of the amount of time initially allocated to achieve the milestone. The capability to tailor the specific cost impacts and schedule in this manner rather than as some fixed percentage is key to forming useful risk factors. It requires more consideration and effort up front but it has been demonstrated to be highly effective.

Figure 8A:
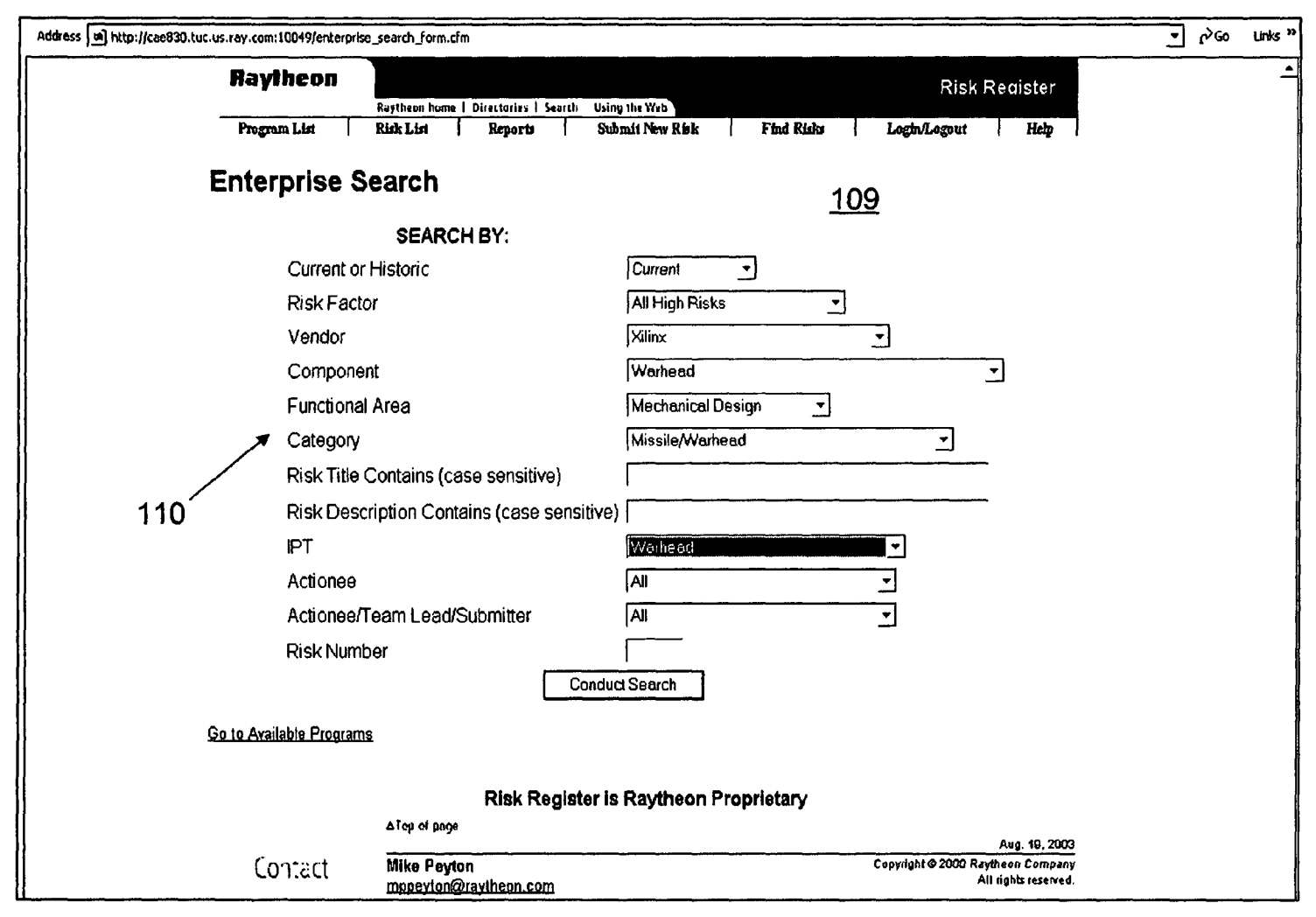

Once the risk management plan has been established and the Pf and Cf tables set, the risk management process moves into the ongoing cycle 106. Each user identifies possible risks associated with his or her assigned task ("Enterprise Risk Search" and "Find Risks") (step 108). To augment their own knowledge and experience, an engineer will use the web browser 64 to generate an enterprise search 109 of the shared database as shown in FIG. 8a. The web interface prompts the engineer to specify a number of search parameters 110 including current or historic, risk factor, vendor, component, functional area, category, key word in title or description, IPT (Integrated Product Team), actionee (engineer), team leader and risk number. The tool searches the shared database 44 on server 42 and returns possible risks 111 as shown in FIG. 8b of which the engineer may accept some, none or all. Each risk has an assigned Risk No, Program, Risk Title, and current Risk Factor. By selecting "Transfer" the user can transfer the risk including any mitigation plan to his/her program where the user can modify the plan. Other tools such as TRIMS, @ Risk, Expert Opinion, Watch Out For List, SEI Taxonomy, etc. may be used to identify risks as well.

Figure 9:
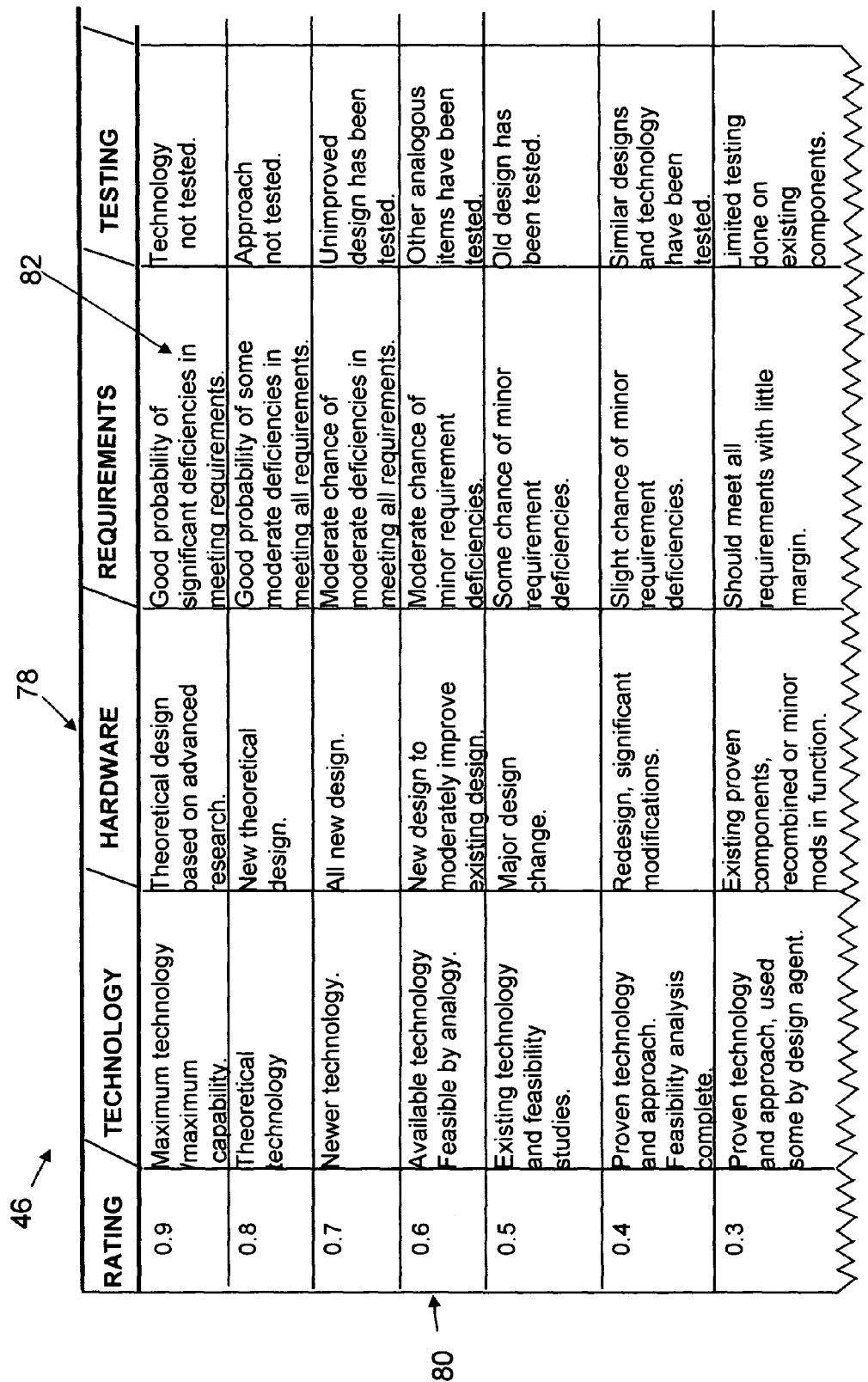
FIG. 9 is a web shot of a Pf table for a particular project.

Once identified, the engineer must enter the risk into the database if the risk was not transferred from another program. To enter a risk, the user clicks on "Submit New Risk" on the menu bar. A page opens allowing information to be authored for all of the risks fields. To assess the risk via the identification of Pf and Cf selections the user clicks on the Pf or Cf table hyperlinks. For each risk, the engineer uses the web browser to view the Pf table 46 configured for the current project as shown in FIG. 9, selects the categories that are 78 most appropriate for the particular risk and selects the qualitative probability definitions 82 that most closely characterizes the risk thereby specifying a value 80 of Pf Then the engineers use the web browser to view the Cf table 48 using a hyperlink located above the Cf category pull down menu. The Cf table is configured for the current project as shown in FIG. 10 and, on the assumption that the risk occurs, selects the cost 86, schedule 88 and performance 90 impacts based on the anticipated consequences. The cost impact may have three different values corresponding to NRE, DTC and O/S. The engineer may formulate a search of the database to access information to assist in this selection. For example, the database may store the unit cost of an alternate design should the new design fail. Thereafter, the tool calculates the risk factor Rf (step 112) as the product of the highest Pf and the highest Cf and classifies the risk as, for example, low, moderate or high. It is possible to construct Rf as a different function of Pf and Cf other than a simple product but this metric has been shown to yield the best results.

The risks, risk factors and the underlying Pf and Cf data are aggregated in the shared database 44, ranked and provided to a risk review board, which review the risks at periodic meetings and oversees the creation, funding and implementation of mitigation plans (step 114). As shown in FIG. 11, the risk list 113 ("Risk List") ranks the risks from highest to lowest risk factor and provides the Risk #, Title and Actionee for each risk. The web interface allows the user to "Edit" the risk description, actionee, assessment, etc., "Mit" to view and edit the risk mitigation plan, "View" the Risk Review Board Report, and "Hide" to hide a risk. Based on this information, for example, low risks may be placed on a watch list and left to the actionee (engineer) to mitigate and receive no other attention from the board; moderate risks may warrant a mitigation plan developed and implemented by the identifying engineer and overseen by the board; and high risks may cause the immediate formation of a special review team including possibly the customer to develop and manage the mitigation plan. Depending upon the size of the project, this process may occur at multiple levels and be subjected to overlapping mitigation plans.

Risk review board meetings are typically held monthly. The customer involved meeting is held to discuss high, moderate and new risks. During the monthly meeting, the proposed risk-handling or mitigation plan is discussed and resources are authorized and applied. To develop the risk mitigation plan, the risk actionee creates the plan with the aid of the risk management tool. The tool allows the actionee to research current mitigation plans as well as past successfully implemented mitigation plans. As shown in FIG. 12*a*, a mitigation search 116 ("Mitigation Search") of the database includes a description of the risk and current status, a start date, original planned complete date, an expected planned complete date and actual complete date. From this the actionee is able to share expenses with other programs with the same or similar mitigation plans, determine pitfalls of past mitigation plans, and develop a plan based upon successful plans. Of course, if the original assessment of Rf was not accurate, resources may be wasted mitigating over prioritized risks or not assigned to address under prioritized risks. This is the reason that precise tailoring of the Pf and Cf tables from the beginning of the process is done.

As a result, risks are captured, assessed, prioritized and mitigation plans 65 are integrated into the Integrated Master Plan before the project starts and the risks actually occur. As shown in FIG. 12*b*, a mitigation plan 65 for a single risk may have multiple mitigation activities. Each activity is numbered, provided with a description, a Pf, a Cf, planned completion date, actual completion date and a description of the results. This window is accessed through "Mit" and is used for editing purposes. At this point, the initial risk mitigation plans 65 are provided to a program schedule manager and schedule review board to incorporate into the master plan and schedule. Although risk management is an important aspect of scheduling, they are generally treated as separate functions and the details of scheduling will not be addressed. To simplify, a tool such as Microsoft Project is used to create a detailed schedule that links all the tasks and sub-tasks and mitigation plans together. As the project progresses, the engineers and managers continually update MS Project to track achieved milestones, slippage and reasons for revision.

As the schedule is implemented and the project progresses it is inevitable that notwithstanding the mitigation plans some risks will occur and new risks will arise. The progress information from MS Project is forwarded to the risk manager to track and report risks (step 118). The web-based tool streamlines the process of preparing and submitting status reports. As shown in FIGS. 13*a* through 13*c*, the web-tool provides a template 120 for inputting minutes 121 from the periodic risk review board meetings to track each risk and generate a report 122 (step 124) that is maintained on the shared database 44. The risk review board (RRB) minutes 121 are generated by clicking "Input New RRB info" on template 120 and submitting general information from the meeting. The RRB date and the risks covered during the meeting are required fields. Minutes for each risk are submitted by clicking "Input/Update Minutes for Risks Covered". Once all the minute information is submitted, the user returns to "RRB Minutes Home", selects the meeting date under "View RRB report" and clicks the "Create Minutes Report" to generate the report 122. The report includes Number, Title, Actionee, Rf, Risk Level and Comments for each risk inserted. This automated creation of minutes allows the user, program manager and board to quickly review and manage many complicated risks in a large-scale development project.

As risks are successfully mitigated and the milestones achieved, the risks are closed (step 126). If a risk changes, the engineer/board reassesses the probability of occurrence and impact (step 112), makes required adjustments to the mitigation plan and submits a program plan adjustment report (step 128). In some cases, a Monte Carlo simulation such as Risk Plus is run on the schedule based on the most optimistic and pessimistic milestone dates and generates additional scheduling risks that are considered. If a new risk or task appears, the engineer identifies the risks (step 108) and repeats the process. If the scope of the project changes, the process returns to the initial phase for reconsideration of the risk management plan (step 74).

As part of tracking and reporting risks, the tool automatically captures and displays valuable information to measure process implementation. Most of the information is automatically captured and/or calculated. Numbers of risks being mitigated or reduced in severity, numbers of risks being identified, and risk exposures are automatically determined monthly for every program. The risk exposure is defined as the sum of the cost multiplied times the probability of each risk for the entire program. This number has been found to be an accurate predictor of cost overruns when proper mitigation is not implemented. Without accurate capture of dollar impacts for each risk provided by the tailored Cf table within the tool, this calculation would not be possible.

Figure 14:
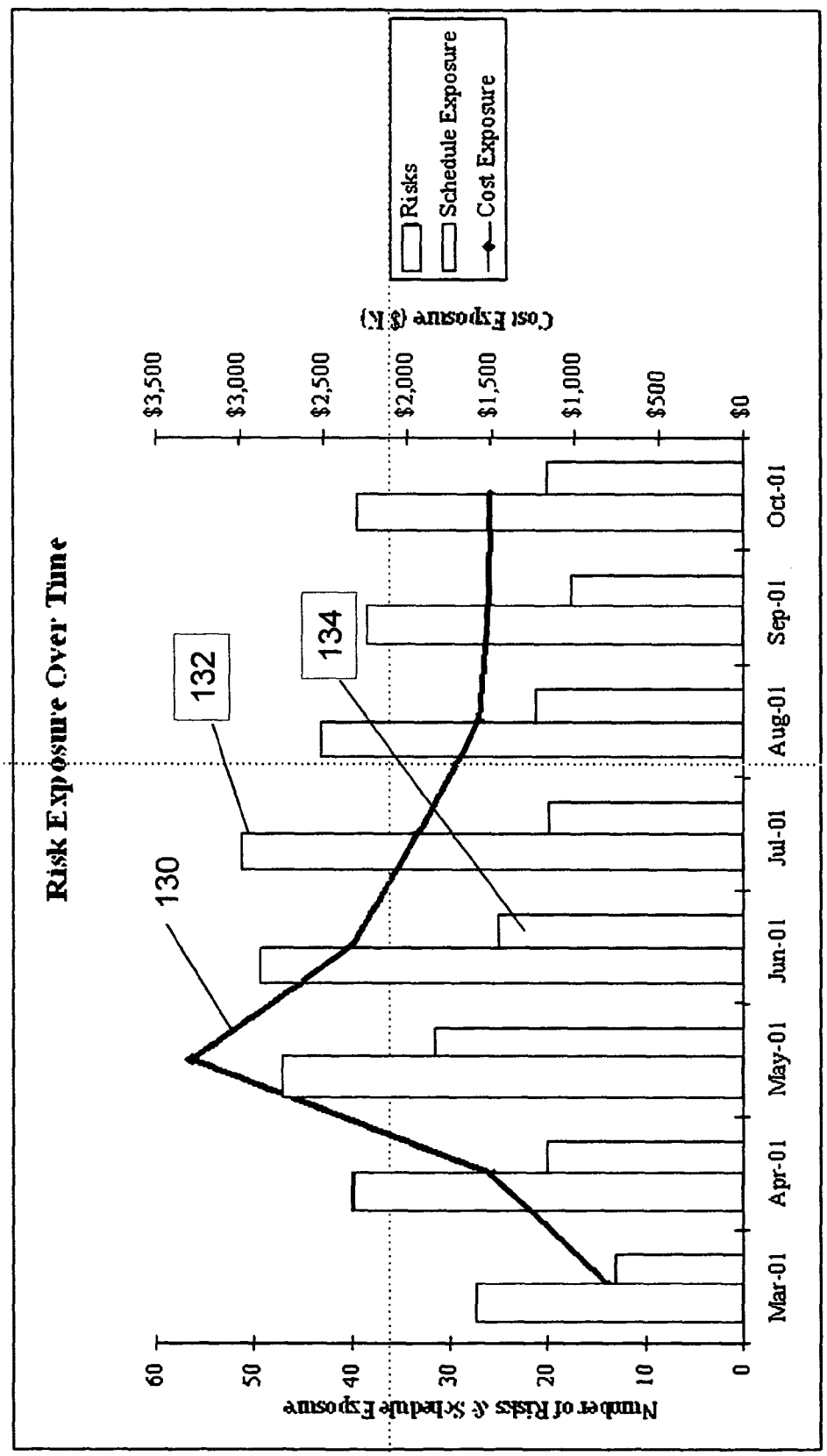
FIG. 14 is a plot of risk, cost and schedule exposure.

FIG. 14 illustrates how the cost exposure 130 of a program increases as risks are identified and slowly decreases as soon as risks begin to be mitigated. At the same time the identification of risks 132 continues to go up showing that the overall risk process is successfully being implemented. If this cost exposure table were to show the cost exposure continuing to increase, then the program would be doing well in the identification of risk, but not necessarily the mitigation of risks. Note that in this situation, risks were identified and properly mitigated and continue to be identified throughout the life of the program. If the risk process is implemented properly, the risk schedule exposure 134 will follow the trend of the cost exposure 130. Schedule exposure is defined using the same calculation, but is not used as a predictor of schedule overrun. It is used as a measure of schedule overrun trends.

The following detailed example is provided to illustrate the effectiveness of the risk management tool of the present invention and to emphasize the importance of a web-based tool that facilitates sharing of information between engineers and projects and the importance of carefully tailoring the probability of occurrence Pf and severity of consequence Cf tables for each program.

Figure 1:
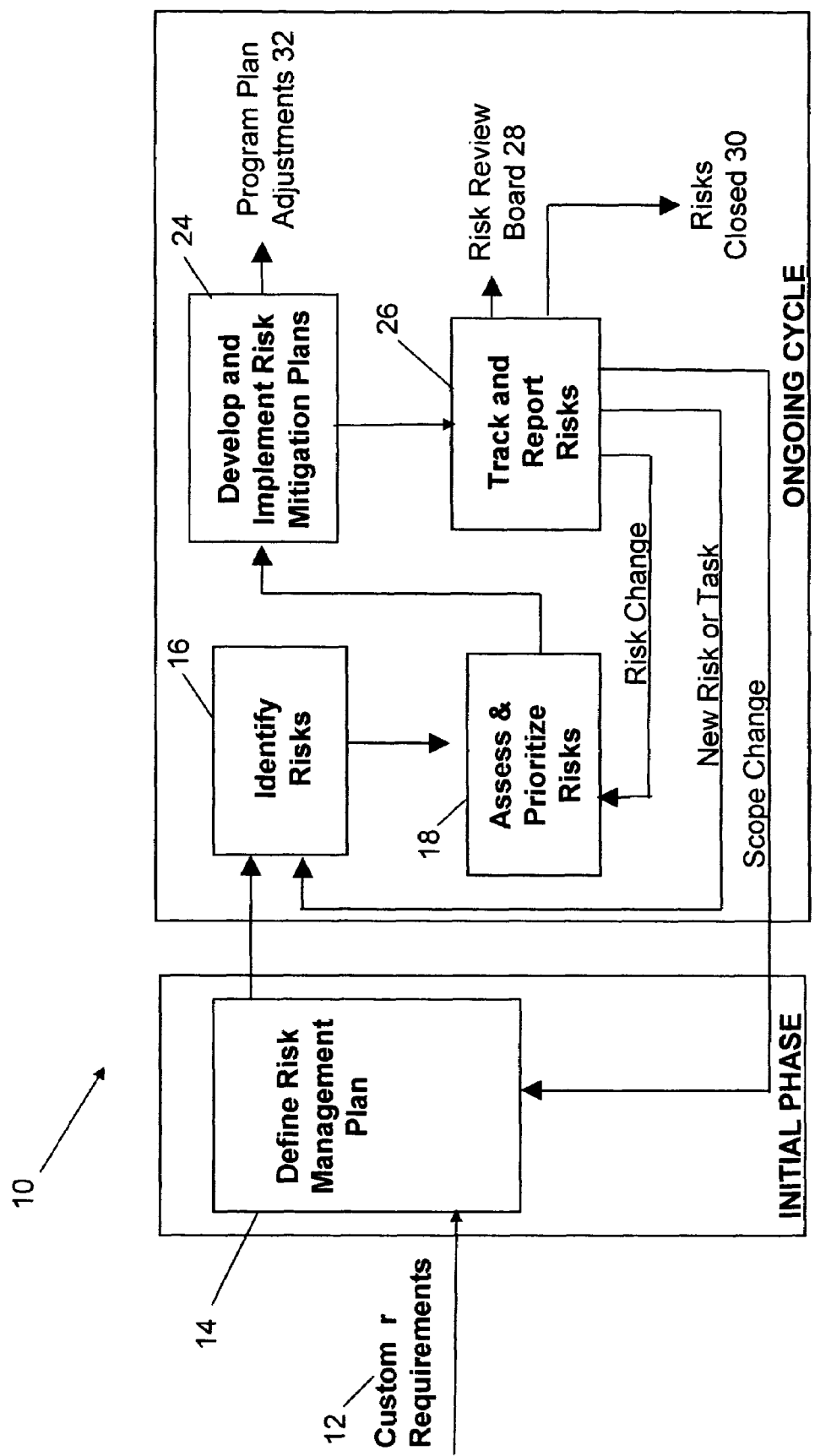
FIG. 1, as described above, is a block diagram of a standard risk management process, FIG. 2, as described above, is a typical probability of occurrence (Pf) table for use in known risk management tools.
Figure 2:
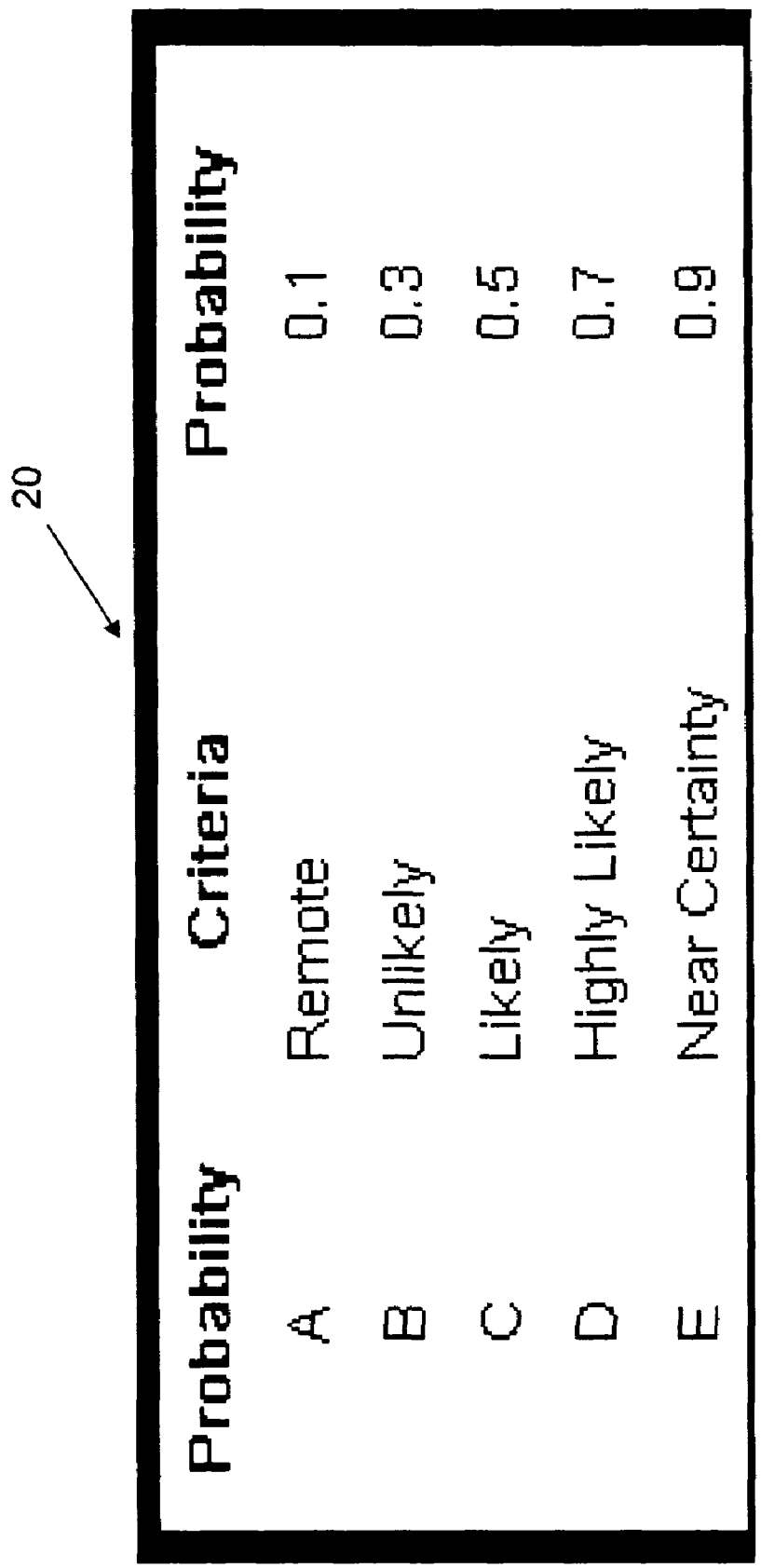
Figure 3:
FIG. 3, as described above, is a typical severity of occurrence table (Cf) for use in known risk management tools.

Two engineers, engineer A and engineer B, are working as team leads for different components of a widget. Engineer A has been an employee for a long time. Engineer B has much less experience. The following two scenarios, Scenario S (Standard Process) and Scenario R (New Process), tell the story of engineers A and B going through the risk process using the Standard Risk Process and tools described with reference to FIGS. 1 through 3 above (Scenario S) and the Risk Management Process and Web based Tool of the present invention (Scenario R). In both scenarios the process begins before Engineer A and B enters the story. A Risk Management Plan is developed for the Widget program by the program management. This is where the two scenarios diverge.

Scenario S:

Risk Management Plan: The Risk Management Plan is developed (Step 14). Within the Plan it is defined that the widget program engineers will use their expert opinions to identify risk (Step 16). Once risks are identified, the Plan dictates the engineers shall use the Probability of Occurrence Table, shown in FIG. 2, to select a probability value for each risk. The engineer uses the Severity of Consequence table, shown in FIG. 3, to select a severity value for each risk. The probability value is multiplied by the severity value for each risk to determine a risk factor. The risks are ranked by this risk factor (Step 18). The engineers develop mitigation plans for their risks, using their expertise (Step 24). The Risks and Mitigation plans are entered into the Standard Risk Tool that stores the risks and creates reports for the widget program. The status of the mitigation plans and risks are tracked and reported throughout the life of the program.

Risk Identification: Engineer A (widget battery team lead), using his vast experience, realizes there will be risk with the design of the battery. It is a brand new design that has never been implemented before, though some analysis has shown it feasible. Engineer A identifies this as a risk, following the Risk Management Plan. At the same time Engineer B (widget housing team lead), being a less experienced engineer, is worried there will be risk redesigning the old housing of a similar widget. Engineer B identifies this as a risk, following the Risk Management Plan. Additionally, Engineer B does not realize that the vendor supplying the material for the housing has issues with delivering on time in the past, and thus no risk for this is identified.

Risk Assessment and Prioritization: Engineer A, following the Risk Management Plan, uses the Probability of Occurrence Table (FIG. 2) and the Severity of Occurrence Table (FIG. 3) to assess his risk. He assesses the probability as a point 0.3, determining the probability of the risk occurring is not "likely", even though he wouldn't describe it as "unlikely" either, he believes it is closer to this definition. Next he assigns the Consequence of his risk. If he is not able to sufficiently design the new battery, an old battery will have to be used, which will cost $100 more than the current battery for each unit (Recurring Cost) and $500,000 in redesign costs (Non Recurring Cost) to make the old battery fit into the widget design. Ordering the old battery would also add 3 months to his delivery schedule. Not sure which cost increase to use for the cost severity he chooses the unit cost, thinking that is the programs priority, and knowing the increase is about 5% of the current battery he assesses a severity of cost of 2. He also notes the schedule severity, but can not enter both cost and schedule so the severity stays at 2. When the probability, 0.3, is multiplied by the severity, 2, the risk factor is a 0.6.

At the same time engineer B assesses his risk for the redesigned housing. Using the probability table he assesses the probability to be a 0.7, thinking it is "highly likely" at least something will go wrong with the design. Next he assessed the severity. Knowing the housing must be redesigned to fit the widget, he knows it will take extra money and time to get the design right should the design not work the first time. He assesses the severity of schedule as a 5, thinking that slipping his delivery would be "can't achieve key milestone", since the milestone is key to him. When the probability, 0.7, is multiplied by the severity, 5, the risk factor is 3.5.

Program management next prioritizes the program risks by risk factor. Because the engineers assessed the risks subjectively based on the vague tables, the housing risk shows up much higher than the battery risk, based on the fact Engineer A had to leave out the schedule impact of the battery risk and both engineers were greatly influenced by their own perceptions and personalities when assessing the probability and severity.

Mitigation: Since the housing risk is one of the highest, the program management helps Engineer B with the mitigation plan, by assigning two more people to the housing team to help with the design. Meanwhile Engineer A, comes up with a mitigation plan on his own that includes some extra testing during the design to catch problems early on. He does not know that a battery tester was developed on another program to mitigate a similar risk, so he spends resources creating a battery tester from scratch.

Tracking and Reporting: Both risks are entered into the standard risk tool and are tracked by program management.

Summary: Since Engineer B missed identifying the risk with the housing material vendor, nothing was done to mitigate their poor delivery history. Characteristically, the vendor delivered two months late. Engineer A spends an additional $250,000 to develop an engineering battery tester, not knowing one already existed on another program. Engineer B has more engineers than he needs for his redesign of an old housing and Engineer A has difficulties with the brand new design, causing additional cost and schedule delays. After delays and costs are incurred, program management transfers designers from engineer B's team over to engineer A's team.

Scenario R:

Risk Management Plan: The Risk Management Plan is developed (step 74). The Plan dictates that the widget program engineers use their expert opinions and risks from other company programs using the shared database (shown in FIG. 4) to identify risk (step 108). Once risks are identified, the Plan dictates the engineers use the Probability of Occurrence Table, shown in FIG. 9, with categories chosen specific to the program, to select a probability value for each risk. The engineer then uses the Severity of Consequence table, shown in FIG. 10, with actual cost and schedule values chosen by the program, to select a severity value for each risk. The probability value is then multiplied by the severity value for each risk to determine a risk factor. The risks are ranked by this risk factor (step 112). The engineers develop mitigation plans for their risks, using their expertise and mitigation plans created for similar risks on other programs using the shared database (step 114). The Risks and Mitigation plans are entered into the Web based Risk Tool that stores the risks and creates reports for the widget program. The status of the mitigation plans and risks are tracked and reported throughout the life of the program.

Risk Identification: Engineer A (widget battery team lead), using his vast experience, realizes there will be risk with the design of the battery. It is a brand new design that has never been implemented before, though some analysis has shown it feasible. He also checks the Web based shared Risk database for similar battery risks. He finds a few but none are applicable to what he is doing. Engineer A identifies this as a risk, following the Risk Management Plan. At the same time Engineer B (widget housing team lead), being a less experienced engineer, is worried there will be risk redesigning the old housing of a similar widget. Engineer B identifies this as a risk, following the Risk Management Plan. Additionally, Engineer B checks the Web based shared Risk database for similar related risks. While searching on the vendor that will supply the material, he finds a risk from another program that details the vendor's previous failures to meet delivery dates. He also identifies a risk for this and will use the same mitigation steps used by the other program to mitigate the risk.

Risk Assessment and Prioritization: Engineer A, following the Risk Management Plan, uses the Probability of Occurrence Table (FIG. 9) and the Severity of Occurrence Table (FIG. 10) to assess his risk. He assesses the probability as a point 0.8, based on the Hardware category and the definition "New design supported by some analysis". Next he assigns the Consequence of his risk. If he is not able to sufficiently design the new battery, an old battery will have to be used, which will cost $100 more than the current battery for each unit (Recurring Cost) and $500,000 in redesign costs (Non Recurring Cost) to make the old battery fit into the widget design. Ordering the old battery would also add 3 months to his delivery schedule. He assesses a severity for Unit cost of 0.2, for NRE cost of 0.5, and a schedule cost of 0.7. He is allowed to enter a value for each unit cost, NRE cost, and schedule. When the Web tool calculates the Risk Factor, it will take the highest value of the three (0.7) to multiply by the probability. When the probability, 0.8, is multiplied by the severity, 0.7, the risk factor is a 0.56 and is assigned a risk rating of High.

At the same time engineer B assesses his risk for the redesigned housing. Using the probability table he assesses the probability to be a 0.5, based on the Hardware criteria of "major redesign of existing components or major functional mods". Next he assesses the severity. Knowing the housing must be redesigned to fit the widget, he knows it will take extra money and time to get the design right should the design not work the first time. He determines worst case it would take 2 months extra and cost $300,000 in extra NRE. Though this seems severe to him, after looking at the severity table, he assesses the severity of schedule as a 0.5, and the NRE cost as a 0.3. When the probability, 0.5, is multiplied by the highest severity, 0.5, the risk factor is a 0.25 and is assigned a risk rating of Moderate.

Program management next prioritizes the program risks by risk factor. Because the engineers assessed the risks objectively using the program tailored assessment tables, the battery risk shows up higher than the housing risk, based on the fact it is a brand new design and has greater cost and schedule consequences.

Mitigation: While developing a Mitigation plan for the battery risk, Engineer A searches Mitigation plans on the Web based shared database for similar risks. He discovers the battery tester developed on another program and is able to borrow the tester from them. Management also adds additional engineers to his team to help with the design. Engineer B develops a mitigation plan for his risk using his expertise and some similar examples found on the Web based shared database to develop a mitigation plan for his risks.

Tracking and Reporting: Both risks are entered into the Web based shared database where they can be viewed by all program personnel and are shared with personnel from other programs.

Summary: Since engineer B identified the housing material vendor risk, a special team was sent to the vendor to ensure on time delivery. The housing material was delivered a week early. Since engineer A had discovered the battery tester from the other program, he was able to borrow it and save the cost of developing his own. With his risk being the highest, extra designers were assigned to his team allowing his design to complete on time. Despite his initial worries, engineer B's redesign of the old housing was simpler than expected and completed successfully within time and budget. Thanks to the correct risks being identified, and the risks being assessed objectively on the same scales, the risks were mitigated adequately for the program to finish on time and on budget.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of managing risk related to a successful completion of a development project, comprising:

storing a probability of occurrence (Pf) table, a severity of consequence (Cf) table, and identified risks in a shared risk database, said Pf table having a plurality of risk categories for the development project, each said category having a plurality of table entries corresponding to different numeric Pf ratings, each entry including a standardized qualitative probability definition associated with the Pf rating wherein the standardized quality probability definition is specific to each category;

providing a risk management tool implemented on a computer, said tool providing an interface to formulate an enterprise search of the risk database and performing the search to identify at least one risk;

for each identified risk, displaying the Pf table to prompt a user to select the one or more risk categories and for each said selected category to select the qualitative probability definition that characterizes the risk thereby specifying a probability of occurrence Pf for each said selected risk category for said at least one risk; and for each identified risk, displaying the Cf table to prompt the user to select at least one severity of consequence Cf, said tool combining the selected Pf and Cf to calculate a risk factor Rf for each identified risk;

formulating a risk mitigation plan including at least one mitigation activity for said at least one risk, said tool calculating an associated risk exposure for said risk mitigation plan based on the probability of occurrence Pf and severity of consequence Cf for said at least one risk;

performing the at least one mitigation activity for said at least one risk to implement the risk mitigation plan;

as the risk mitigation plan is implemented over time, said tool displaying the Pf and Cf tables to prompt a user to reassess the at least one risk and select Pf and Cf, said tool updating the prioritized risk factor Rf;

said tool recalculating the risk exposure for the updated risk factors and displaying a chart of the risk exposure versus time as mitigation activities are performed and risk factors updated; and adjusting the mitigation plan based on the risk exposure.

2. The method of claim 1, wherein the severity of consequence table has cost and schedule impact categories, each said category having a plurality of table entries, each entry including a standardized qualitative impact definition and a project-specific amount associated with a Cf rating, said tool displaying the severity of consequence table to prompt users to view the cost and schedule impact categories and the standardized qualitative impact definitions for each said at least one risk and to select the Cf rating, said tool calculating and displaying the displayed risk exposure including a cost exposure and a schedule exposure that are based on the project-specific amounts associated with the selected Cf rating.

3. The method of claim 2, wherein the table entries in the schedule impact category specify a project-specific amount in days, weeks or months and the table entries in the cost impact category include multiple sub-categories of project-specific cost impacts in actual dollars for the development project, said tool prompting the user to select a Cf rating for each said sub-category, said tool calculating and displaying the schedule exposure and cost exposure for all risks.

4. The method of claim 3, further comprising a user having administrative access not provided to said plurality of users, said tool first prompting the user to tailor the severity of consequence table to select the cost impact sub-categories and specify their dollar amounts and to specify the schedule impact in days, weeks or months for the current development project, said tool storing the tailored probability of occurrence table on the shared risk database with access to said plurality of users.

5. The method of claim 2, wherein said multiple sub-categories include development cost (NRE), unit cost (DTC) and operations and support (O/S) categories, said tool calculating and displaying the cost exposure for NRE, DTC and O/S.

6. The method of claim 5, wherein the user selects a Cf rating for each of the NRE, DTC and O/S cost impact sub-categories, said tool uses the respective CF ratings used to determine the displayed cost exposure for the different sub-categories.

7. The method of claim 2, wherein the user selects a Cf rating for each of the cost and schedule impact categories, said tool using the respective Cf ratings used to determine the displayed cost exposures and schedule exposure.

8. The method of claim 7, wherein the tool calculates the product of the maximum Cf rating with the maximum Pf to define the prioritized risk factor Rf.

9. The method of claim 1, further comprising a user having administrative access not provided to a plurality of users, said tool prompting the user to first tailor the probability of occurrence table to select a reduced number of categories that are relevant to the current development project, said tool storing the tailored probability of occurrence table on the shared risk database with access to said plurality of users.

10. The method of claim 1, wherein the enterprise search includes a combination of at least two parameters including current or historic, risk factor, vendor, component, functional area, category, key work in risk title, key work in risk description, IPT, actionee, actionee/team lead/submitter or risk number.

11. The method of claim 10, wherein the enterprise search results list at least one risk including a combination of risk number, program, risk title and a current risk factor.

12. The method of claim 1, wherein existing risk mitigation plans including one or more mitigation activities for different risks are stored in the shared database, the formulation of the risk mitigation plan comprising:

said tool prompting a user to formulate a mitigation search of the risk database and performing the search to identify existing risk mitigation plans for the identified risk;

said tool prompting a user to formulate a new risk mitigation plan that's builds upon the one or more existing risk mitigation plans; and said tool storing the new risk mitigation plan on the shared database.

13. The method of claim 12, wherein the tool provides a transfer link from said at least one risk with its risk mitigation plan to import the selected risk and mitigation plan into another program.

14. The method of claim 12, wherein the mitigation search performed by the tool includes a combination of at least two parameters including a risk description, risk status, start date, original planned complete date, planned complete date and complete date.

15. The method of claim 12, further including said tool automatically generating risk reports including identified risks, prioritized risk factors and mitigation plans.

16. The method of claim 12, wherein the tool supports a web browser having an interface that includes a menu bar with pull-down menu items and menu sub-items for viewing the current program, conducting the enterprise search and conducting the mitigation search and hyperlinks to the Pf and Cf tables.

17. The method of claim 12, wherein the tool identifies both successful and unsuccessful existing risk mitigation plans.

18. The method of claim 12, further comprising:

said tool aggregating the risk mitigation plans from a plurality of different users and different programs to update and store a risk mitigation plan on the shared database.

19. The method of claim 12, further comprising:

sharing resources with other programs to implement the mitigation plan.

20. The method of claim 12, where the risk mitigation plan includes a number of activities, each activity including a description and an assigned Pf and Cf rating.

21. The method of claim 1, wherein the tool calculates the risk exposure as the sum of severity of consequence associated with the Cf rating multiplied by the probability Pf for each said risk.

22. The method of claim 1, wherein the Cf table includes cost and schedule impact categories each having a plurality of table entries, each entry including a standardized qualitative impact definition and an amount associated with a CF rating, for each identified risk the tool prompts the user to select both a cost and a schedule Cf rating, for each identified said tool combining the maximum Cf rating with the maximum Pf for the one or more risk categories to define the prioritized risk factor Rf.

23. A web-based risk management system for managing risk related to a successful completion of a development project, comprising:

a server comprising a shared risk database that stores a probability of occurrence (Pf) table, a severity of consequence (Cf) table, risk identification information and risk mitigation information in a shared risk database, said Pf table having a plurality of risk categories for the development project, each said risk category having a plurality of table entries corresponding to different numeric Pf ratings, each entry including a standardized qualitative probability definition associated with the Pf rating wherein the standardized quality probability definition is specific to each category;

a web-based risk management tool on the server that provides standardized interfaces for searching, viewing and entering information to and from the shared risk data base via a web browser;

a communications network; and a plurality of computer workstations in communication with the server via the communications network, each said workstation provided with a web browser to search the database using the standardized interfaces, said tool identifying risks and risk categories for each identified risk, said tool displaying the Pf and Cf tables to prompt a user to select an entry and its Pf rating from the Pf table for each risk category and an entry and its Cf rating from the Cf table and said tool calculating a risk factor Rf for each risk based on the Pf and Cf ratings.

24. The system of claim 23, wherein existing risk mitigation plans including mitigation activities for different risks are stored in the shared database, said tool via said web browser provides an interface for the user to formulate and perform a mitigation search of the risk database to identify existing risk mitigation plans for the identified risk, formulate a new risk mitigation plan that builds upon the one or more existing risk mitigation plans, store the new risk mitigation plan on the shared database, said tool calculating an associated risk exposure for all identified risks based on the Pf and Cf ratings, displaying a chart of risk exposure over time and facilitating adjustments to the mitigation plan based on the risk exposure.

25. The system of claim 24, wherein the tool's standardized interface includes a menu bar with pull-down menu items and menu sub-items to view the current programs, to view program risks, to conduct an enterprise search to identify risks and to formulate the risk mitigation search to identify mitigation plans and hyperlinks to the Pf and Cf tables.

26. The system of claim 24, wherein the workstation via the web browser submits an enterprise search that includes a combination of at least two parameters including current or historic, risk factor, vendor, component, functional area, category, key word in risk title, key word in risk description, IPT, actionee, actionee/team lead/submitter or risk number and the server returns via the web browser an enterprise search results list including for at least one risk a combination of risk number, program, risk title, a current risk factor and its risk mitigation plan.

27. The system of claim 24, wherein the workstation via the web browser submits a mitigation search that includes a combination of at least two parameters including a risk description, risk status, start date, original planned complete date, planned complete date and complete date and the server returns existing mitigation plans that satisfy the search parameters.

28. The system of claim 24, wherein the mitigation search identifies both successful and unsuccessful existing risk mitigation plans.

29. The system of claim 24, wherein the web browser facilitates sharing resources with other programs to implement the mitigation plan.

30. The system of claim 23, wherein the Cf table has a schedule impact category with table entries, each entry including a standardized qualitative impact definition and a project-specific schedule impact amount in days, weeks or months and having a cost impact category with table entries, each entry including a standardized qualitative impact definition and project-specific cost impact amounts for multiple sub-categories of cost impacts in actual dollars for the development project, said web browser providing administrative access to at least one user to tailor using said tool the Pf table to have fewer categories that are relevant to the current project and the Cf table to specify the amounts in days, weeks or months of the table entries in the schedule impact category and the amounts in actual dollars for the multiple sub-categories in the cost impact category, said tool prompting via the web-browser a user to select Cf ratings for each of the schedule impact and the multiple sub-categories of cost impacts, said risk management tool computing and displaying a schedule exposure based on Pf and the Cf rating for schedule impact and a cost exposure for each sub-category based on Pf and the Cf rating for each said sub-category.

31. The system of claim 23, wherein the severity of consequence (Cf) table includes cost and schedule impact categories each having a plurality of table entries, each entry including a standardized qualitative impact definition and a project-specific amount associated with a Cf rating, said tool prompting the user to select both a cost and schedule CF rating and calculating the risk factor RF as the product of the highest selected Pf and the highest selected Cf for each identified risk.

32. A web-based risk management system for managing risk related to a successful completion of a development project, comprising:

a server comprising a shared risk database that stores a probability of occurrence (Pf) table, a severity of consequence (Cf) table, risk identification information and risk mitigation information, said Pf table having a plurality of risk categories for the development project, each said risk category having a plurality of table entries corresponding to different numeric Pf ratings, each entry including a standardized qualitative probability definition associated with a Pf rating wherein the standardized quality probability definition is specific to each category, said Cf table having cost and schedule impact categories each having a plurality of table entries, each entry including a standardized qualitative impact definition and a project-specific amount associated with a Cf rating;

a web-based risk management tool on the server that provides standardized interfaces for searching, viewing and entering information to and from the shared risk data base via a web browser;

a communications network; and a plurality of computer workstations in communication with the server via the communications network, each said workstation provided with a web browser configured to search the database using the standardized interfaces, said tool identifying risks and risk categories for each identified risk, said tool displaying the Pf and Cf tables to prompt a user to select a Pf rating for each risk category and cost and schedule Cf ratings, said tool calculating a risk factor Rf as the product of the highest selected Pf rating and the highest selected Cf for each risk, said tool executing a mitigation search to formulate a risk mitigation plan including at least one mitigation activity for said at least one risk, said tool calculating an associated cost exposure and schedule exposure for the identified risks based on the Pf and Cf ratings, as the risk mitigation plan is implemented over time, said tool via the web-browser displaying a chart of the cost exposure and schedule exposure over time, displaying the Pf and Cf tables to prompt a user to reassess the at least one risk and select Pf and Cf to update the prioritized risk factors Rf and adjust the mitigation activities based on the cost or schedule exposure.

33. The system of claim 32, wherein the cost impact category includes multiple sub-categories each having a project-specific amount, each said sub-category being assigned its own Cf ratings, said tool using the respective CF ratings to determine the displayed cost exposure for the different sub-categories.

34. The system of claim 33, wherein the sub-categories include development cost (NRE), unit cost (DTC) and operations and support (O/S).

* * * * *